(12) United States Patent
Waseda et al.

(10) Patent No.: US 7,866,891 B2
(45) Date of Patent: Jan. 11, 2011

(54) ROLLING BEARING APPARATUS

(75) Inventors: Yoshitaka Waseda, Nisshin (JP);
Tsuyoshi Okumura, Yamatokoriyama (JP)

(73) Assignee: Jtekt Corporation, Osaka-shi, Osaka (JP)

( * ) Notice: Subject to any disclaimer, the term of this patent is extended or adjusted under 35 U.S.C. 154(b) by 389 days.

(21) Appl. No.: 12/073,136

(22) Filed: Feb. 29, 2008

(65) Prior Publication Data
US 2008/0310787 A1    Dec. 18, 2008

(30) Foreign Application Priority Data

| Mar. 2, 2007 | (JP) | P2007-052579 |
| Mar. 14, 2007 | (JP) | P2007-065624 |
| Mar. 21, 2007 | (JP) | P2007-073781 |

(51) Int. Cl.
*F16C 33/60* (2006.01)

(52) U.S. Cl. ........ 384/457; 384/570

(58) Field of Classification Search ........ 384/457, 384/570, 502, 503
See application file for complete search history.

(56) References Cited

U.S. PATENT DOCUMENTS

| 1,790,253 A | * | 1/1931 | Taylor | 384/457 |
| 7,270,484 B2 | * | 9/2007 | Waseda | 384/570 |
| 2007/0116393 A1 | * | 5/2007 | Oishi et al. | 384/457 |

FOREIGN PATENT DOCUMENTS

| JP | 54-163247 | 12/1979 |
| JP | 2005-180459 | 7/2005 |
| JP | 2005-337352 | 12/2005 |
| JP | 2006-170421 | 6/2006 |
| JP | 2006-292132 | 10/2006 |
| JP | 2006-322580 | 11/2006 |
| JP | 2006-336765 | 12/2006 |

* cited by examiner

*Primary Examiner*—Thomas R Hannon
(74) *Attorney, Agent, or Firm*—McGinn IP Law Group, PLLC

(57) ABSTRACT

A rolling bearing apparatus is provided that rotatably supports a cam shaft in a cylinder head of an engine. The rolling bearing apparatus includes a plurality of rolling elements; a cage that positions the rolling elements so as to be spaced at regular intervals from each other in a circumferential direction and that retains the rolling elements in a freely rotatable manner; a shell-type outer ring configured to receive the rolling elements and the cage and having a raceway surface of the rolling elements at an inner side thereof; and an outer ring fastening member formed of a material having almost the same thermal expansion coefficient as the shell-type outer ring and having a press-fit portion press-fitted to the shell-type outer ring.

6 Claims, 23 Drawing Sheets

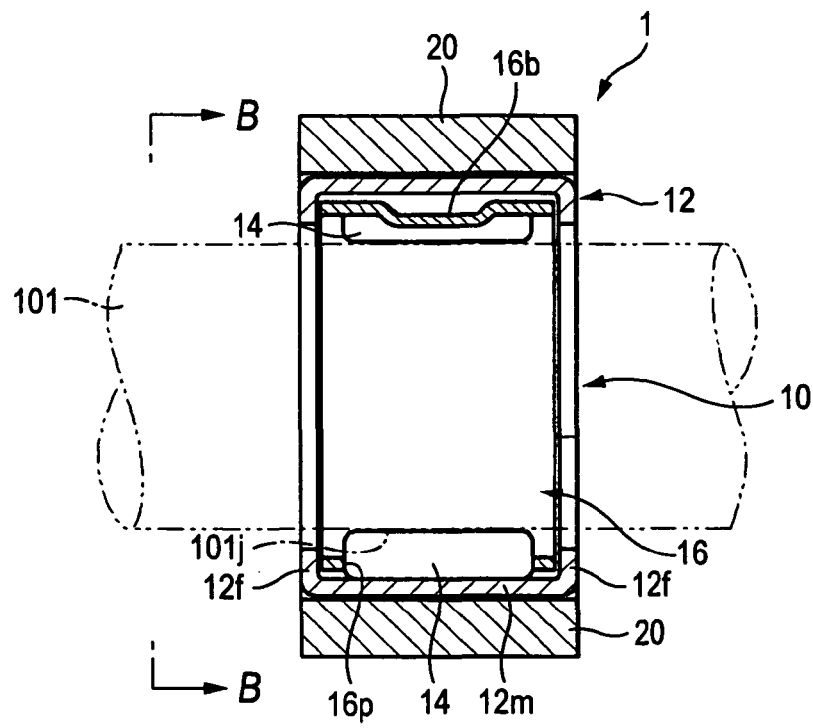
FIG. 1A
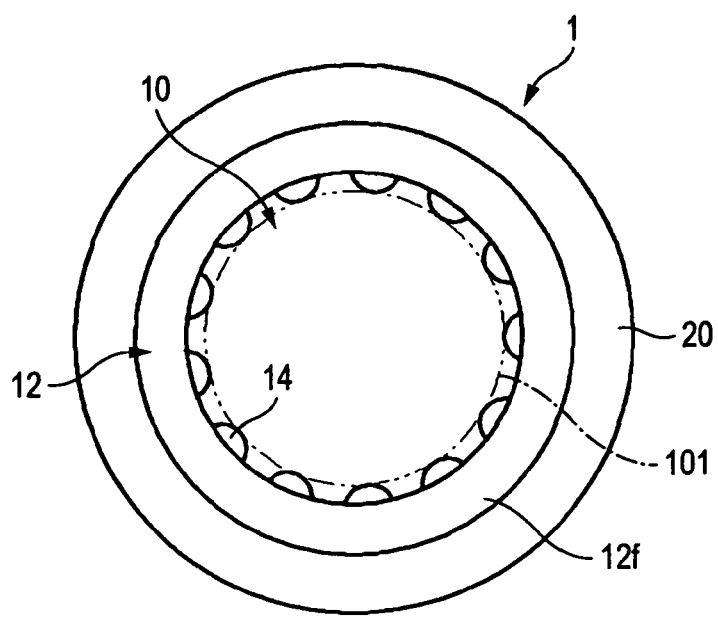
FIG. 1B

FIG. 2A
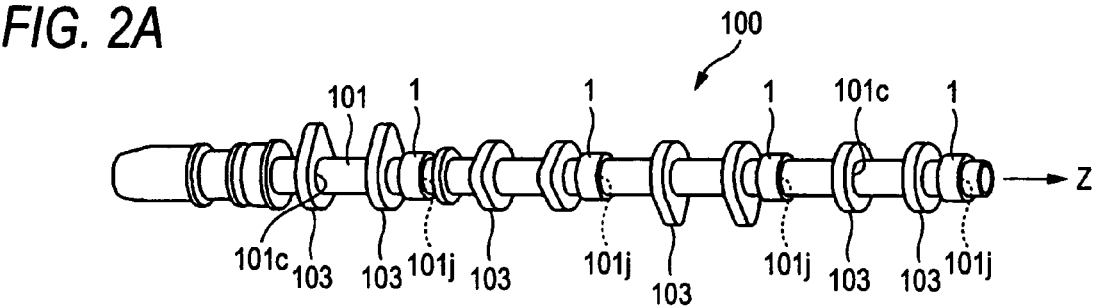
FIG. 2B
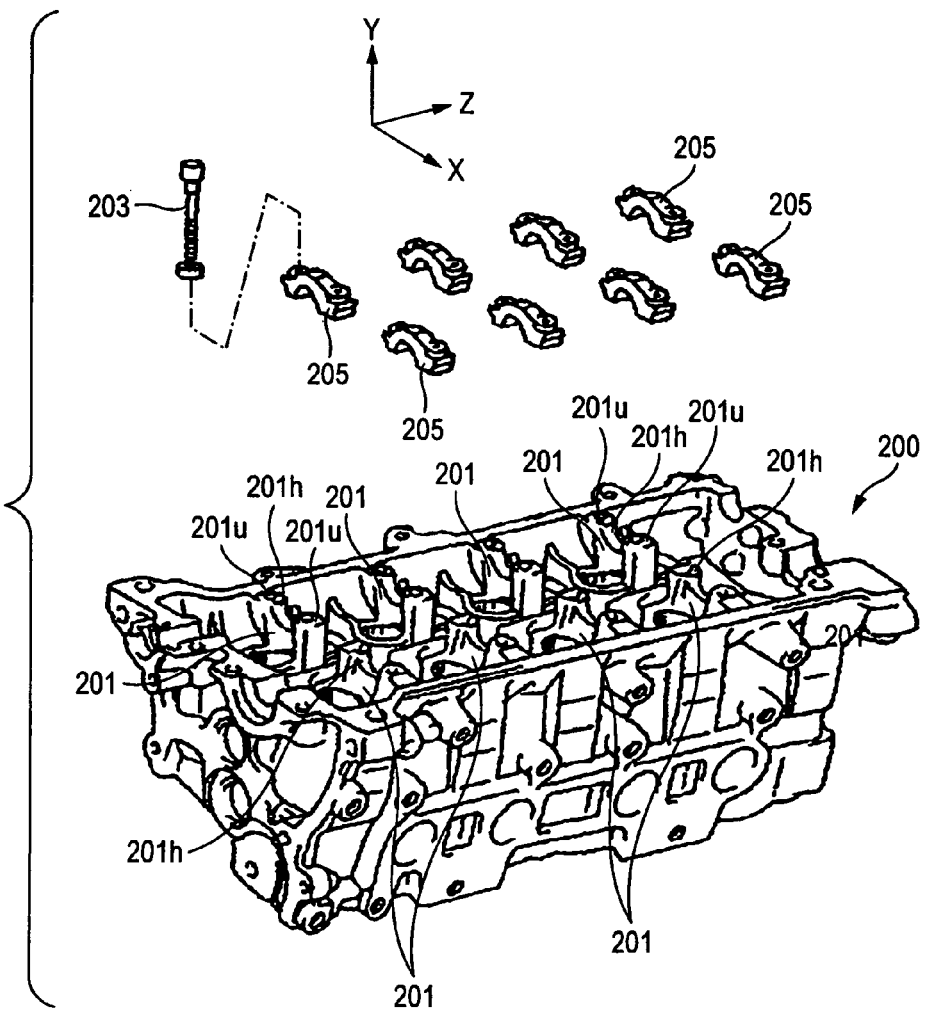

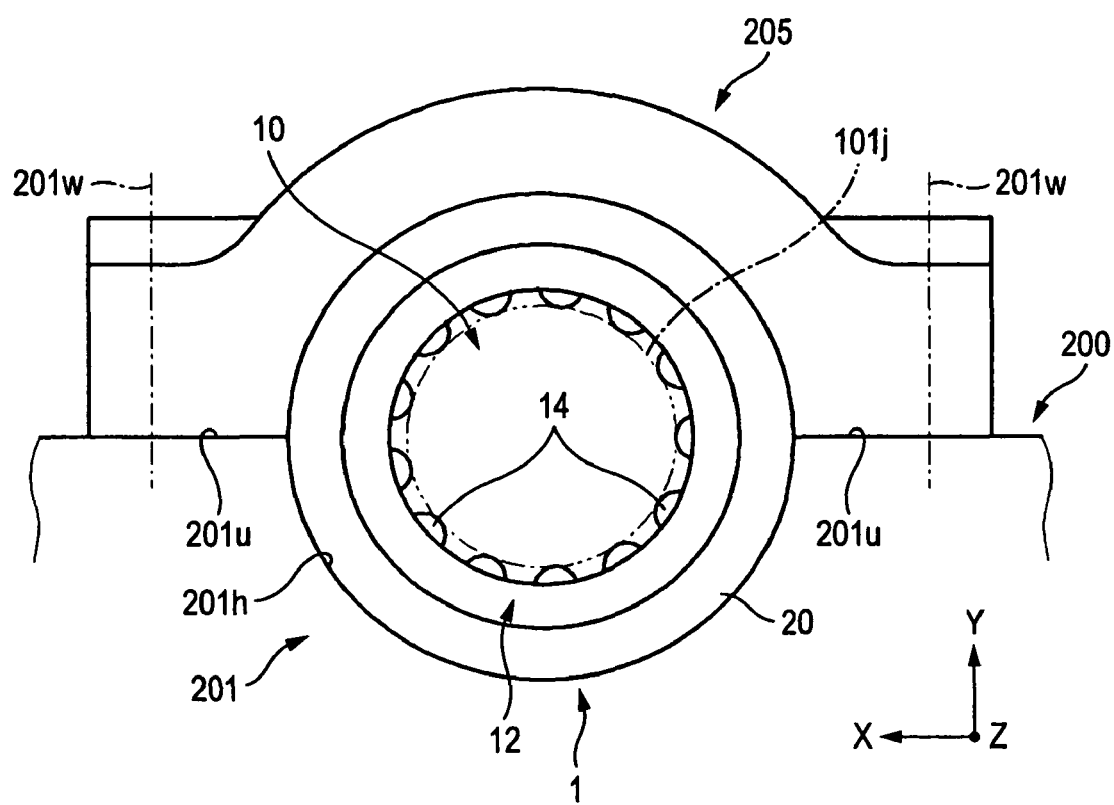
FIG. 3

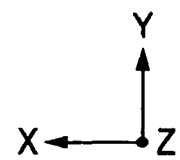
FIG. 4A
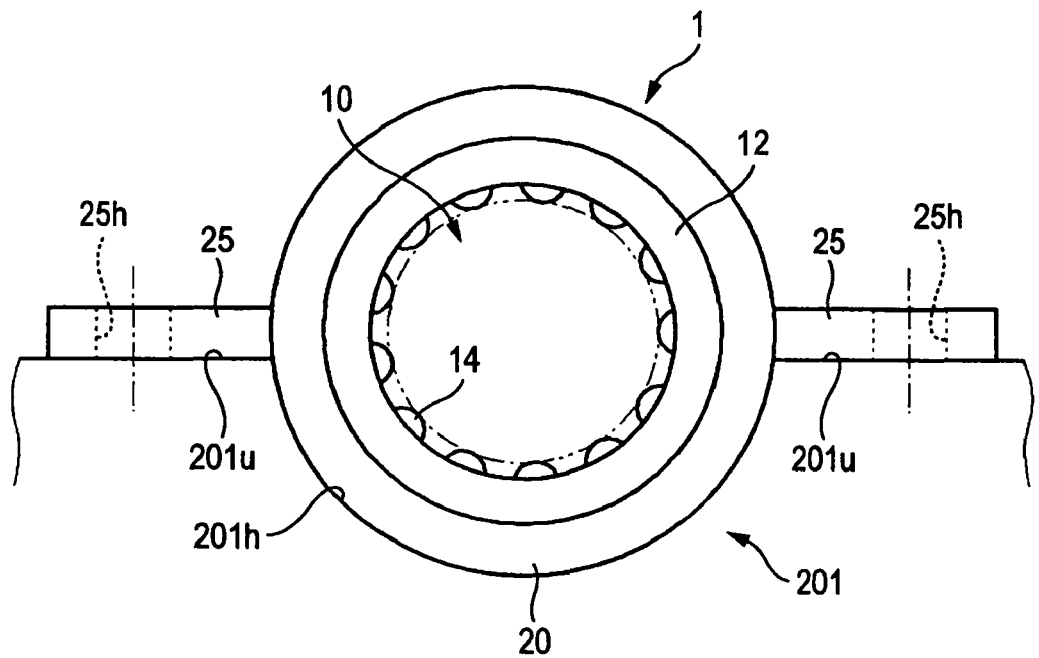
FIG. 4B
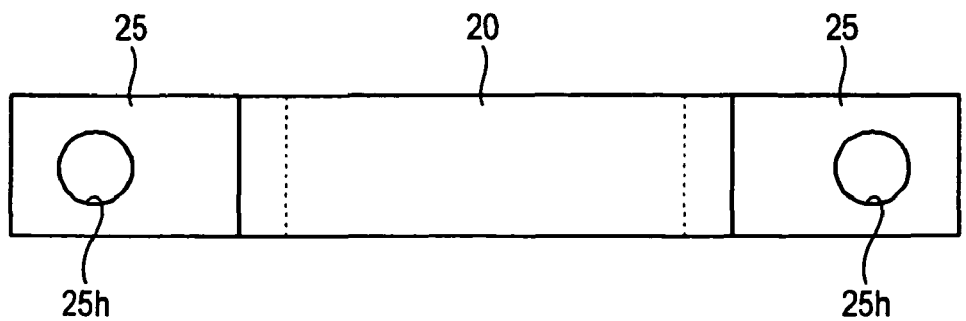

FIG. 5A
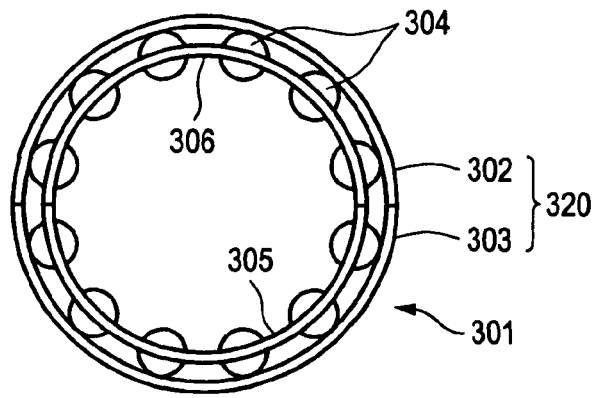
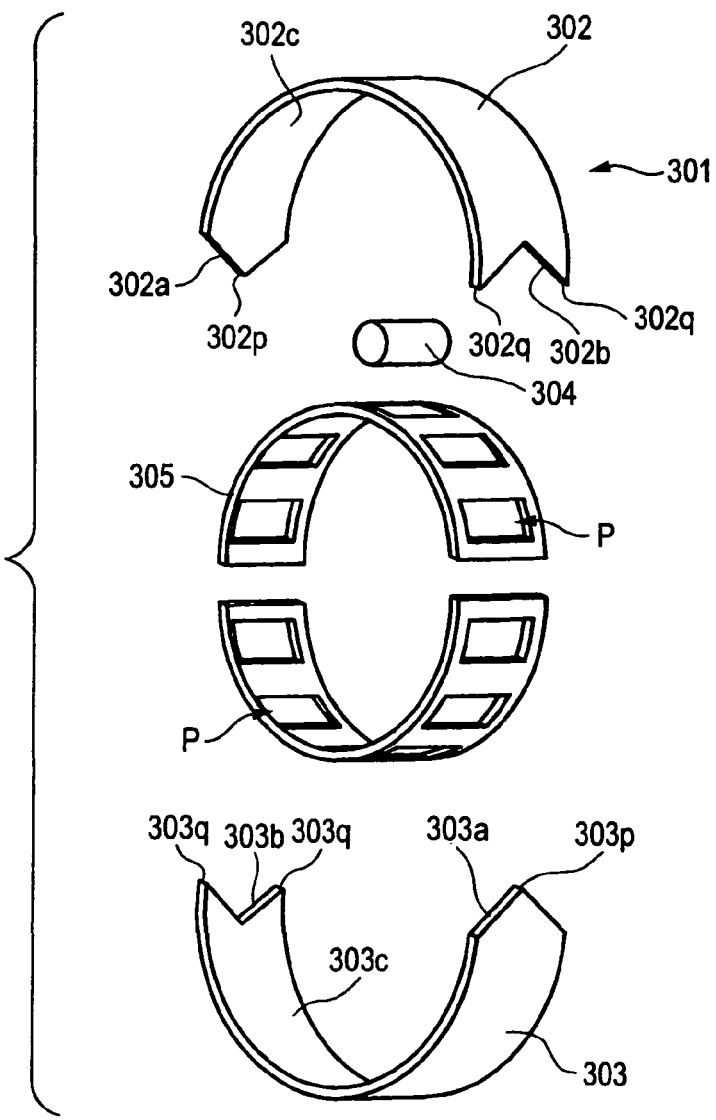
FIG. 5B

FIG. 6
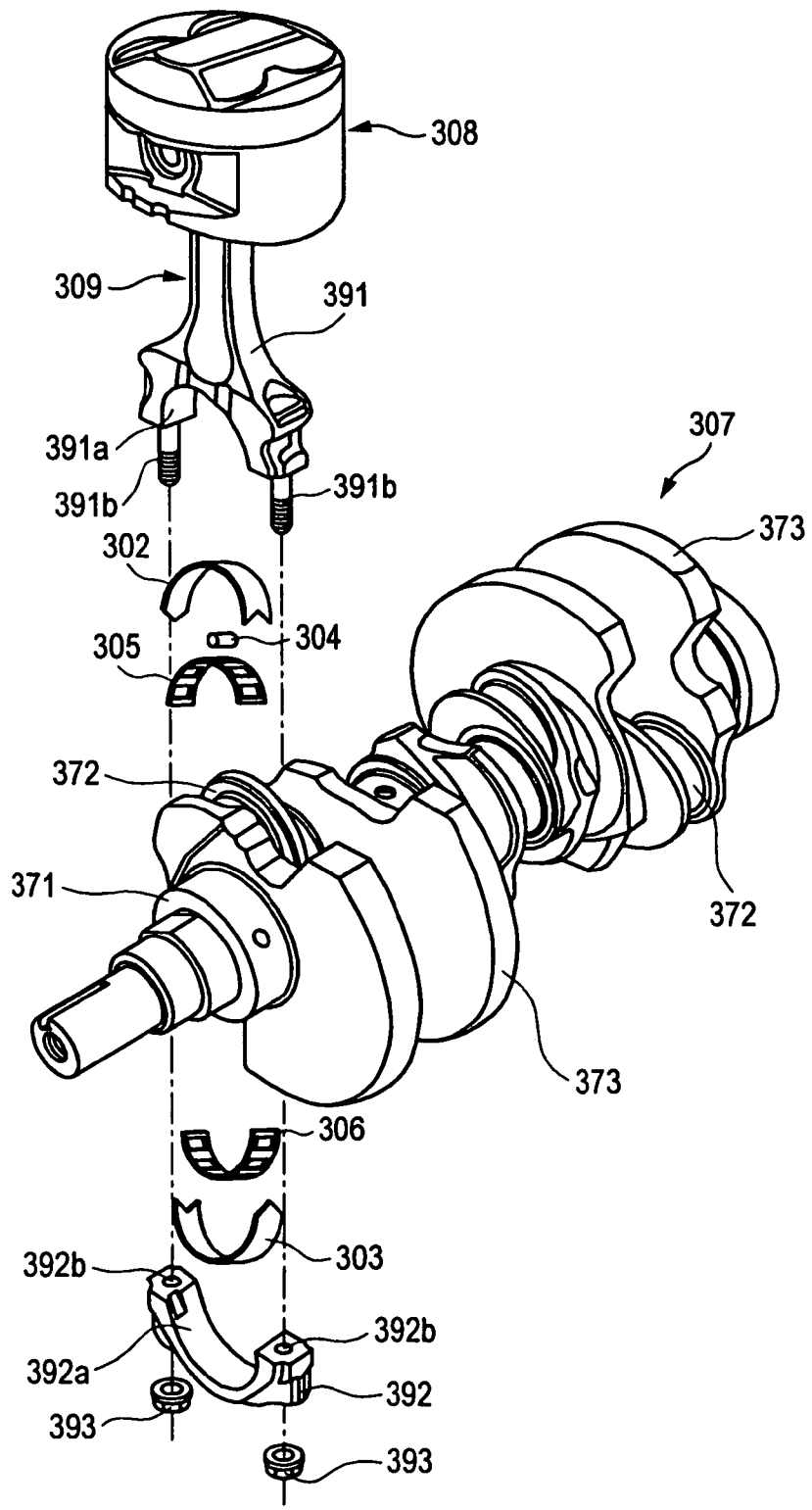

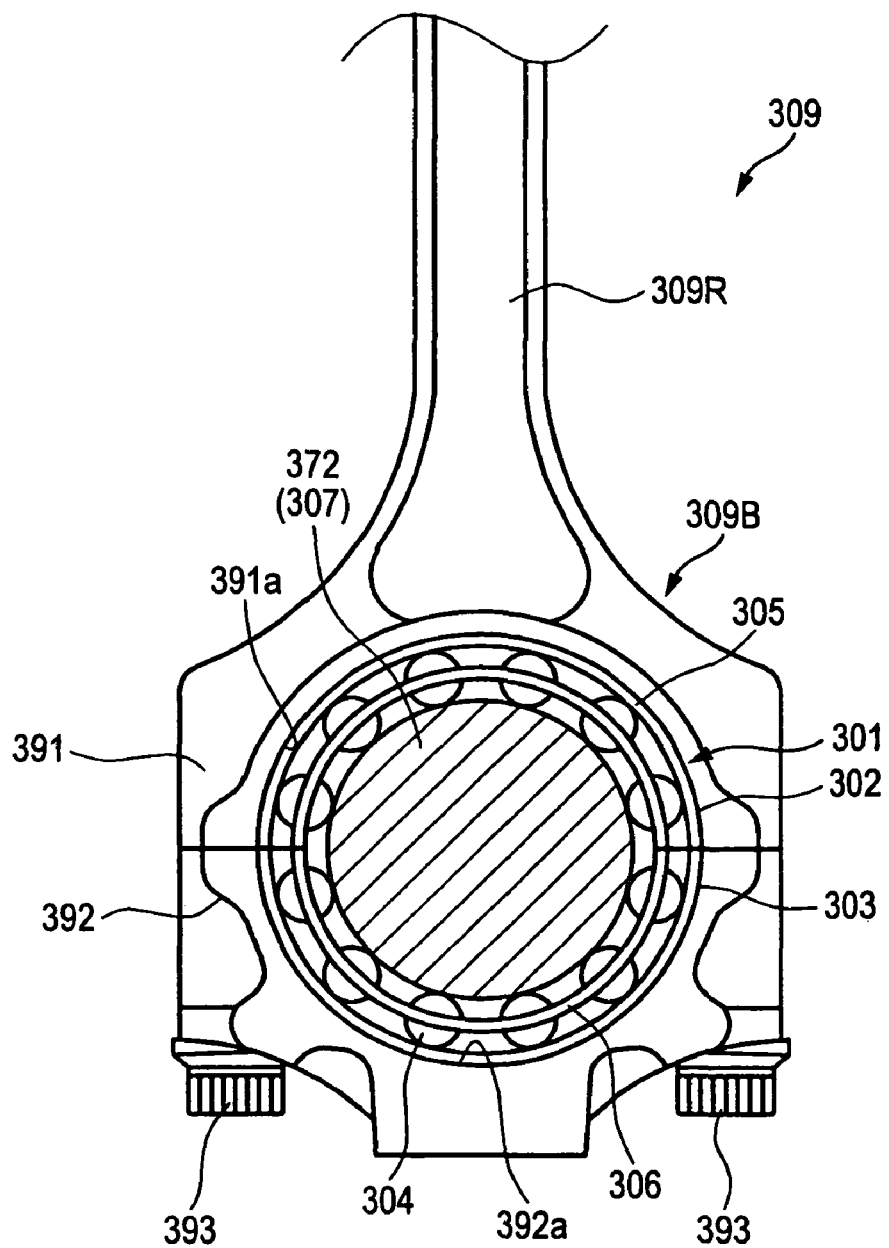
FIG. 7

FIG. 8A
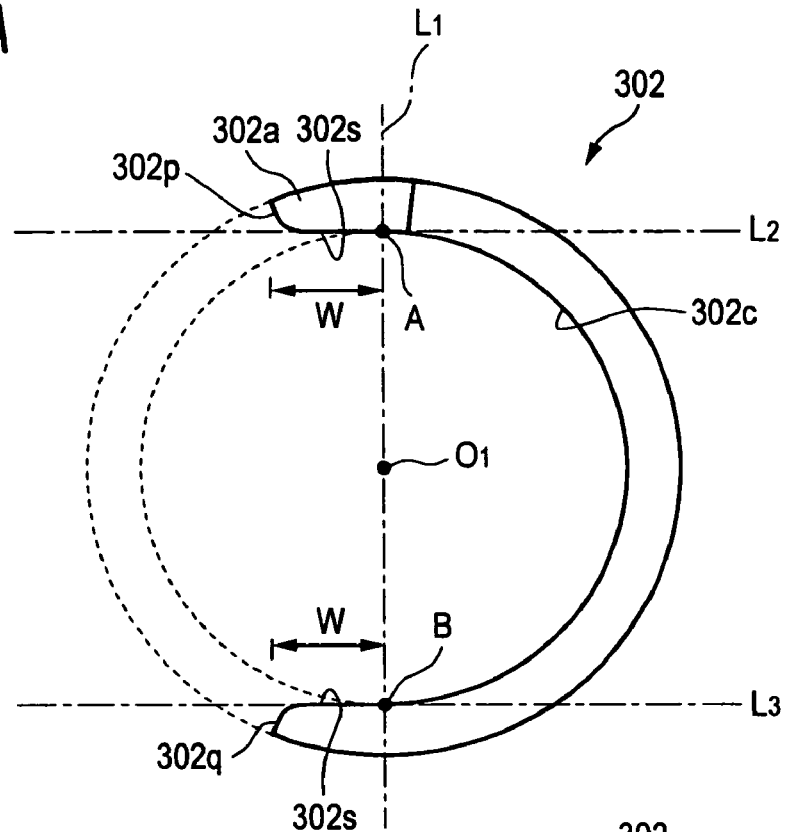
FIG. 8B
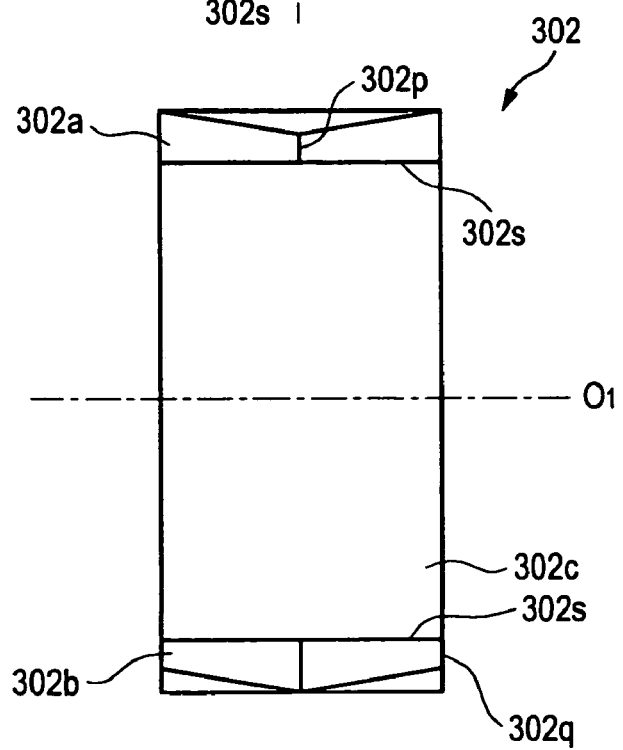

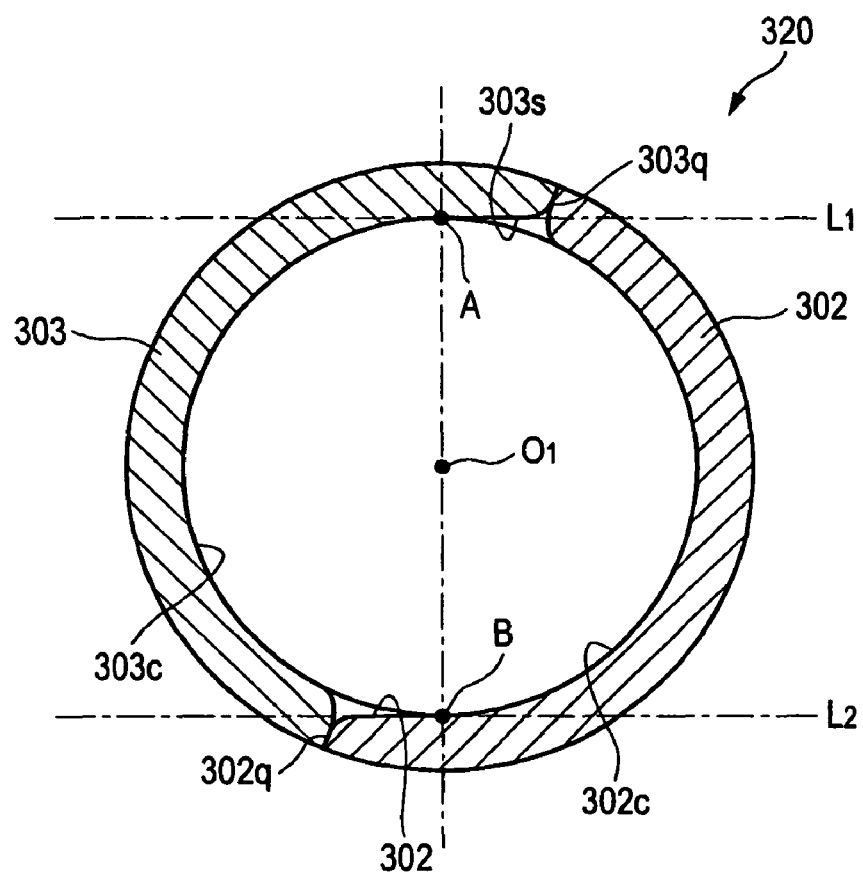
FIG. 9

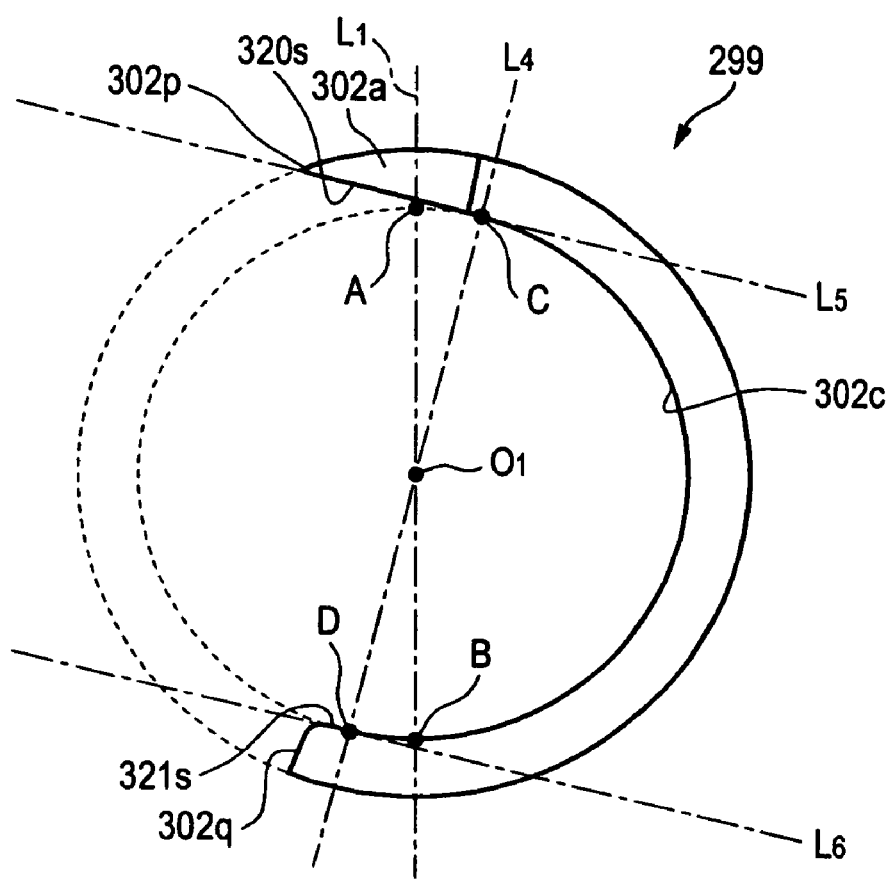
FIG. 10

FIG. 11
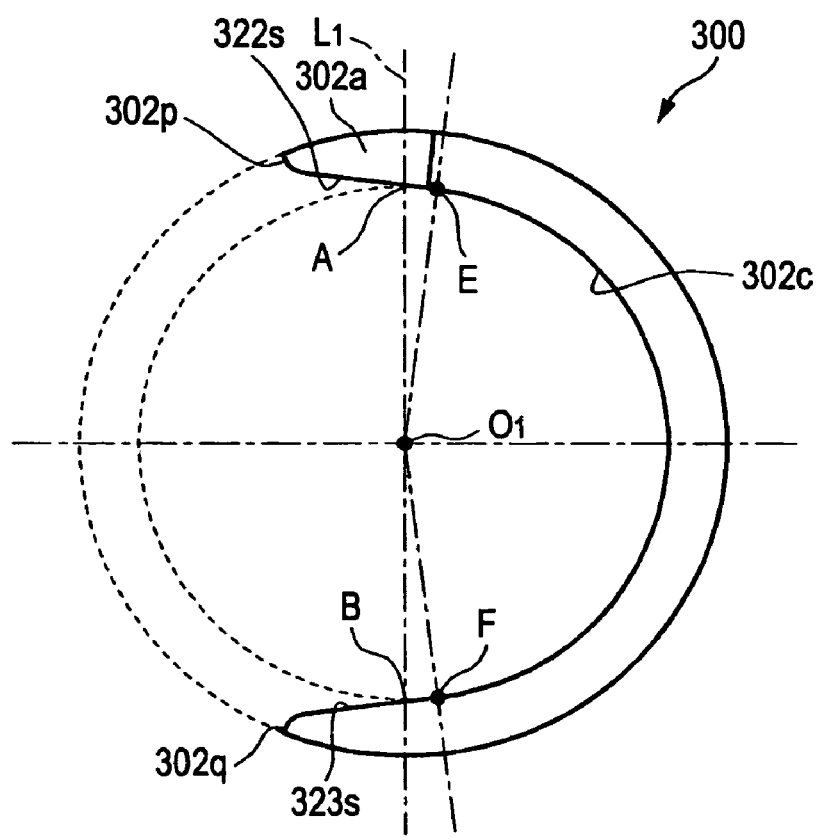

*FIG. 12A*
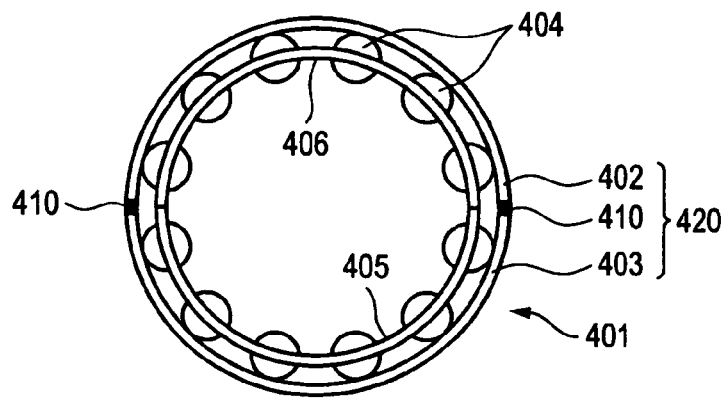
*FIG. 12B*
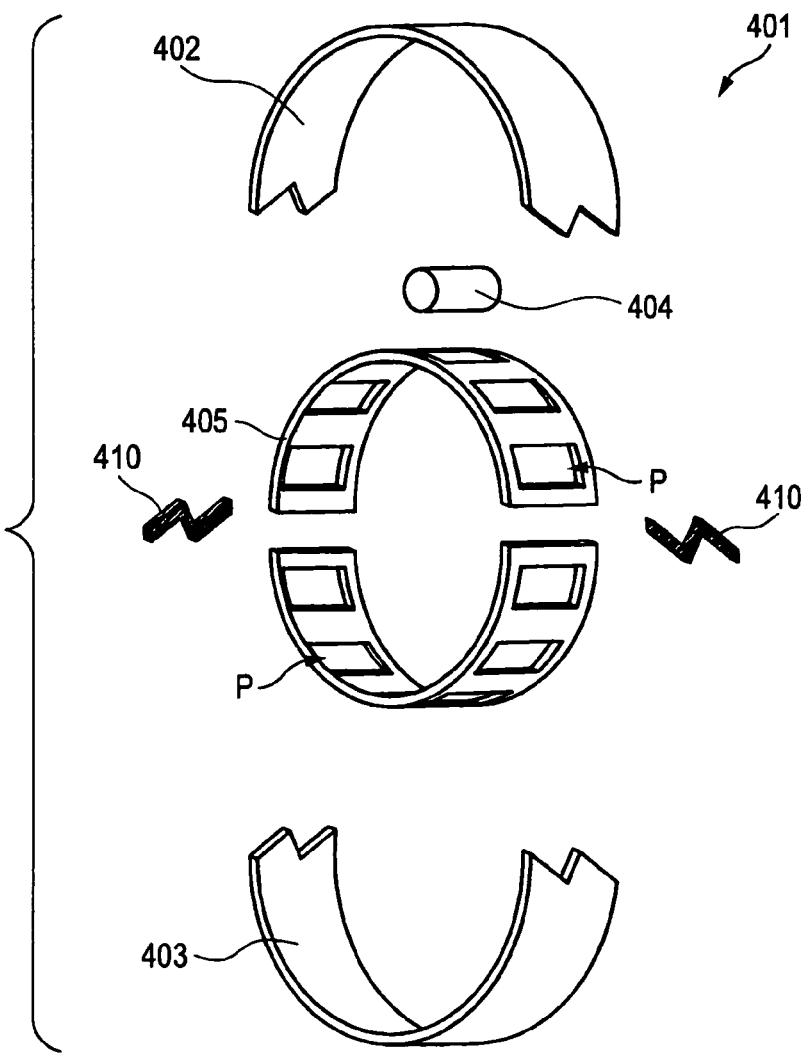

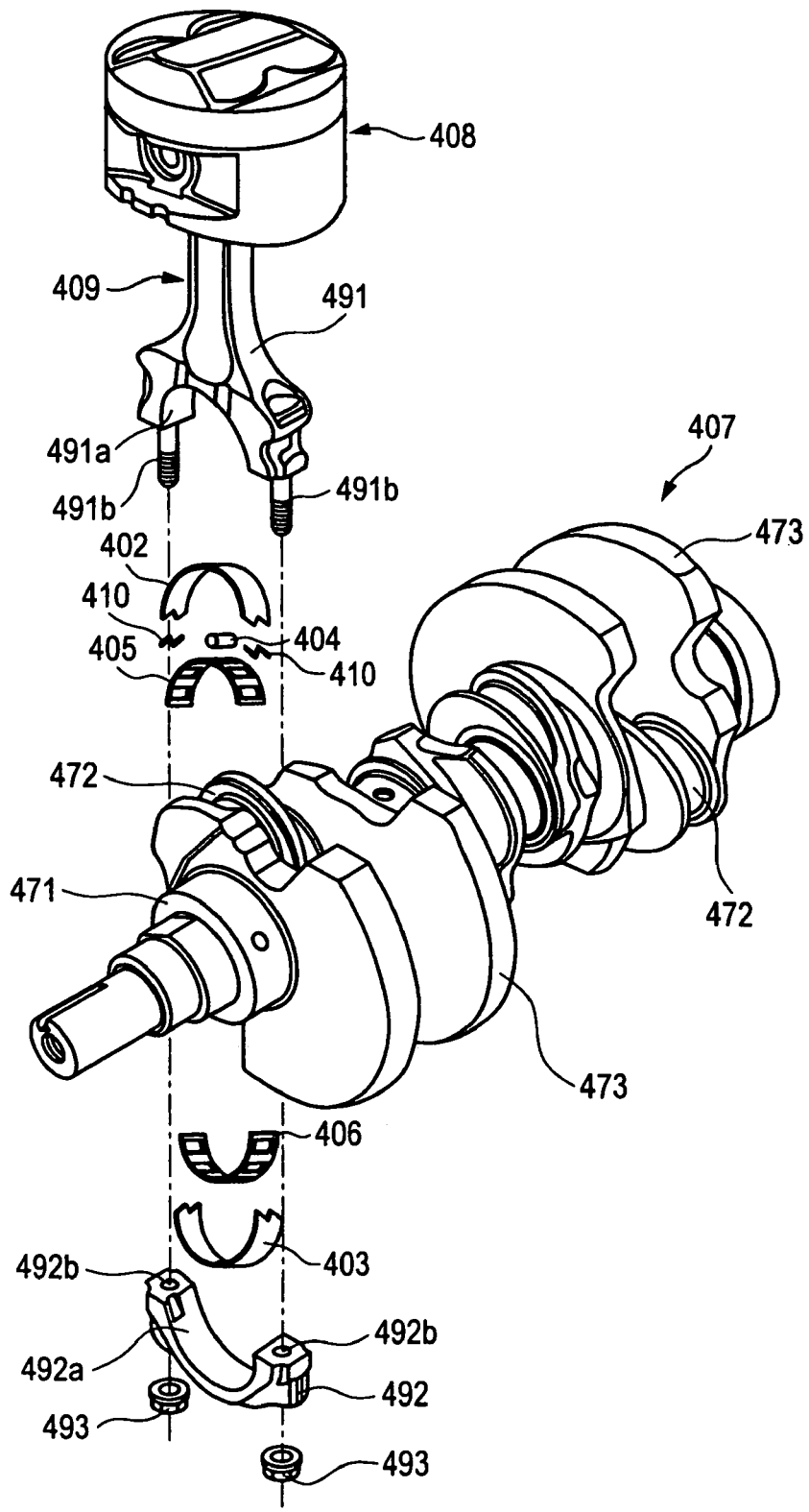
FIG. 13

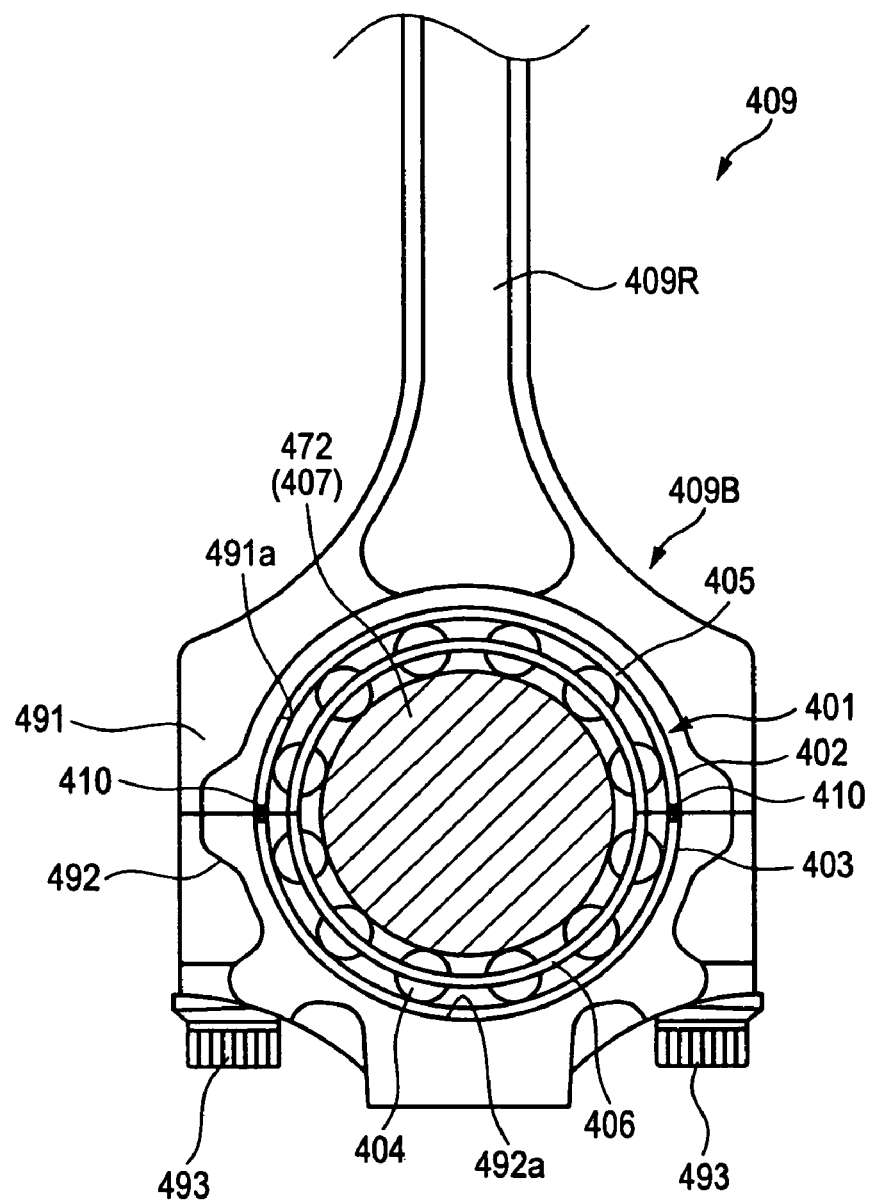
FIG. 14

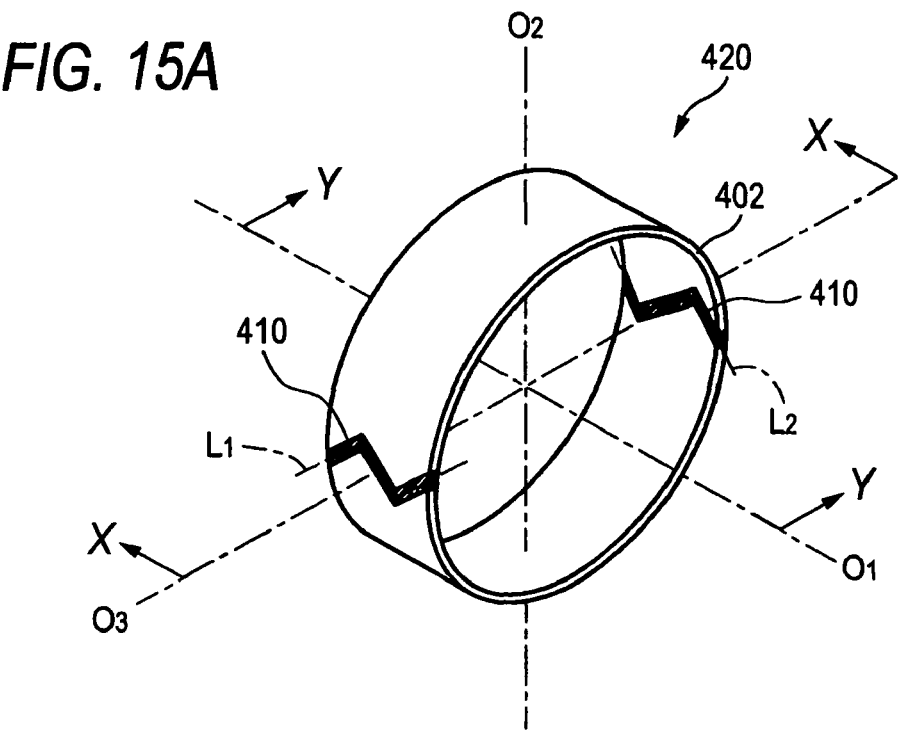
FIG. 15A
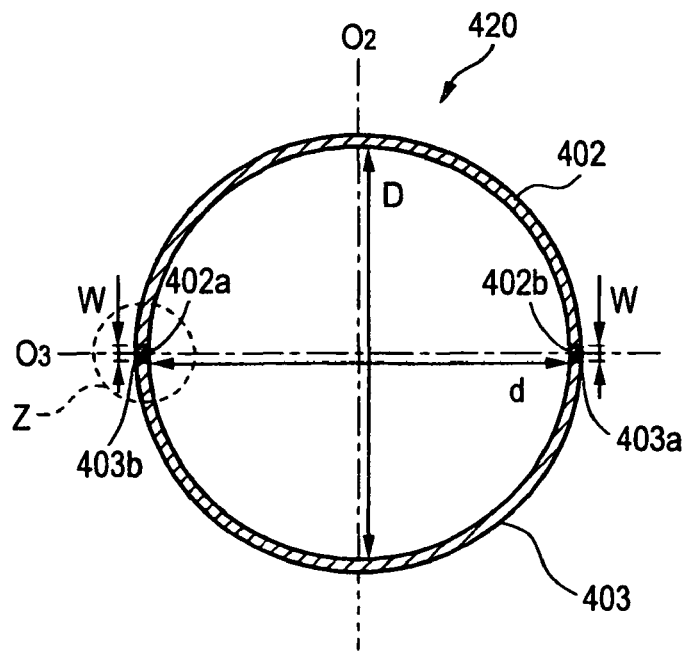
FIG. 15B
X-X SECTIONAL VIEW
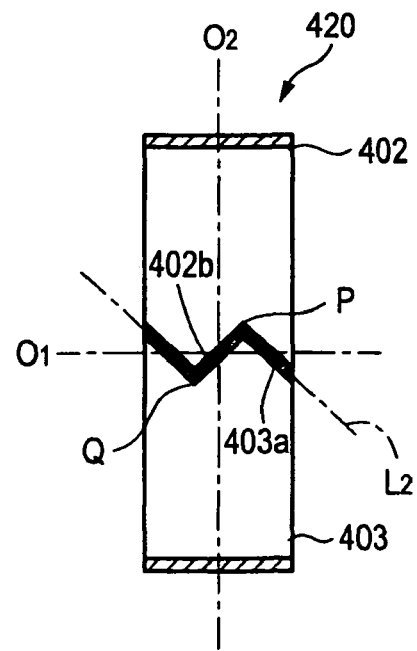
FIG. 15C
Y-Y SECTIONAL VIEW

FIG. 16
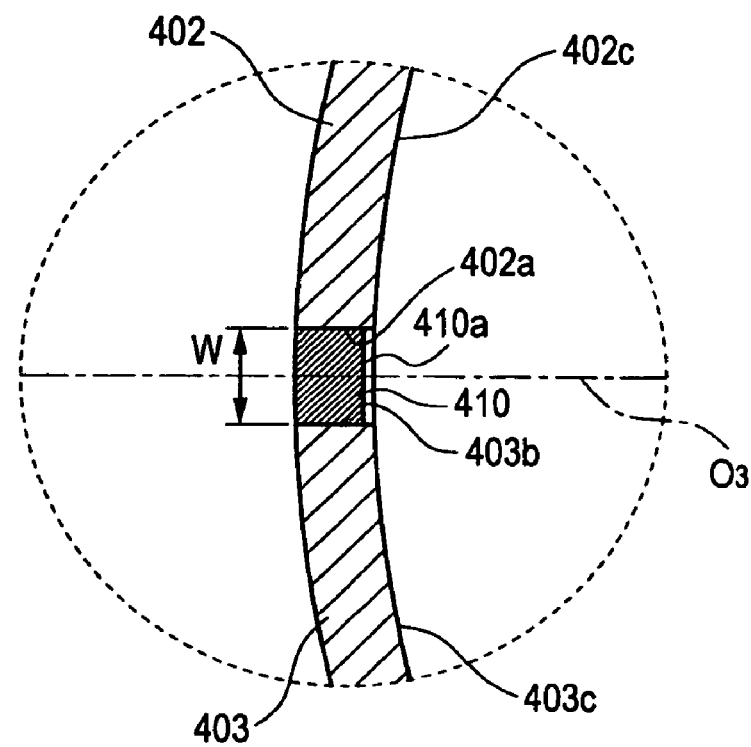
ENLARGED VIEW OF
Z PORTION

FIG. 17A
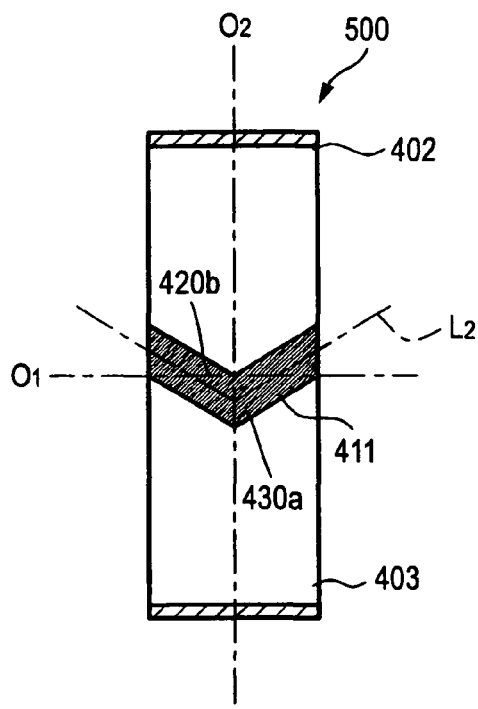
FIG. 17B
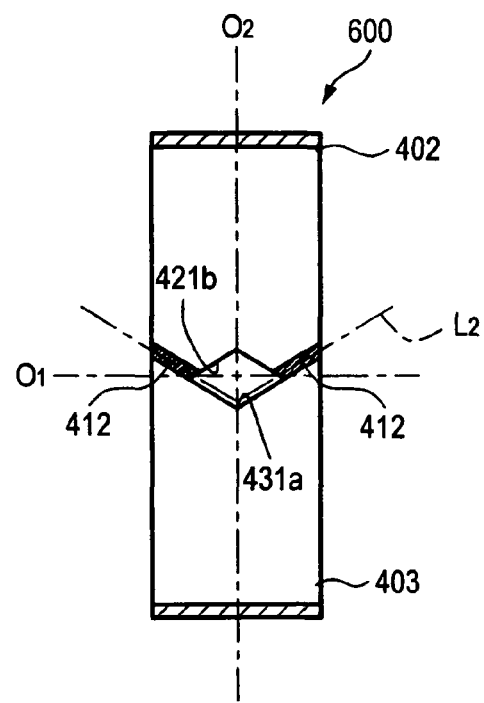

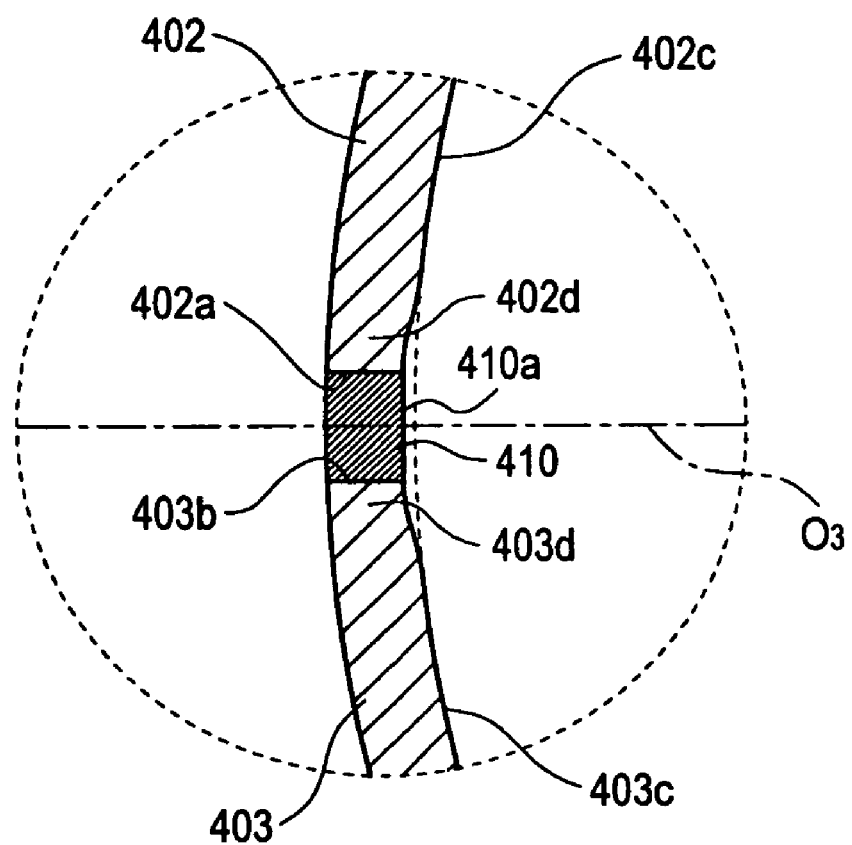
FIG. 18

FIG. 19A
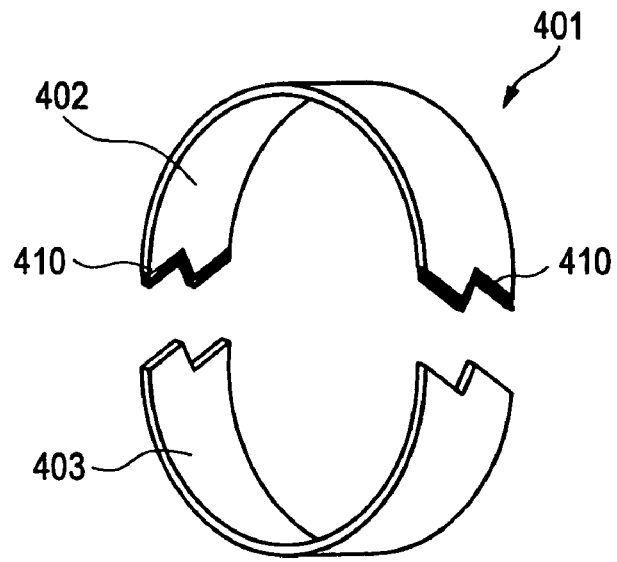
FIG. 19B
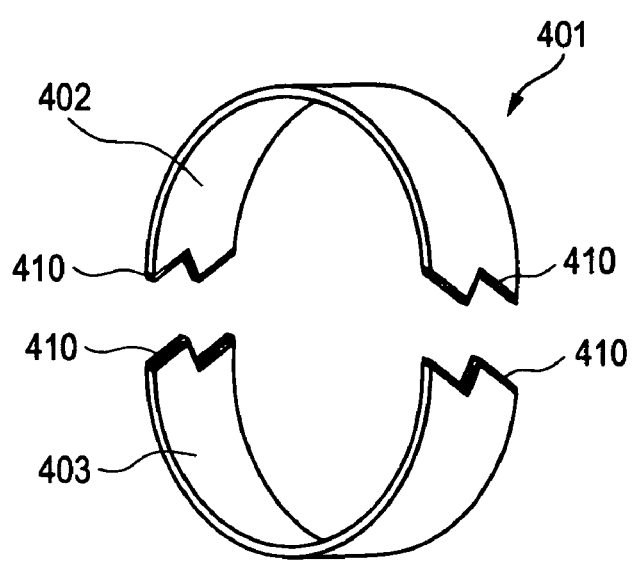

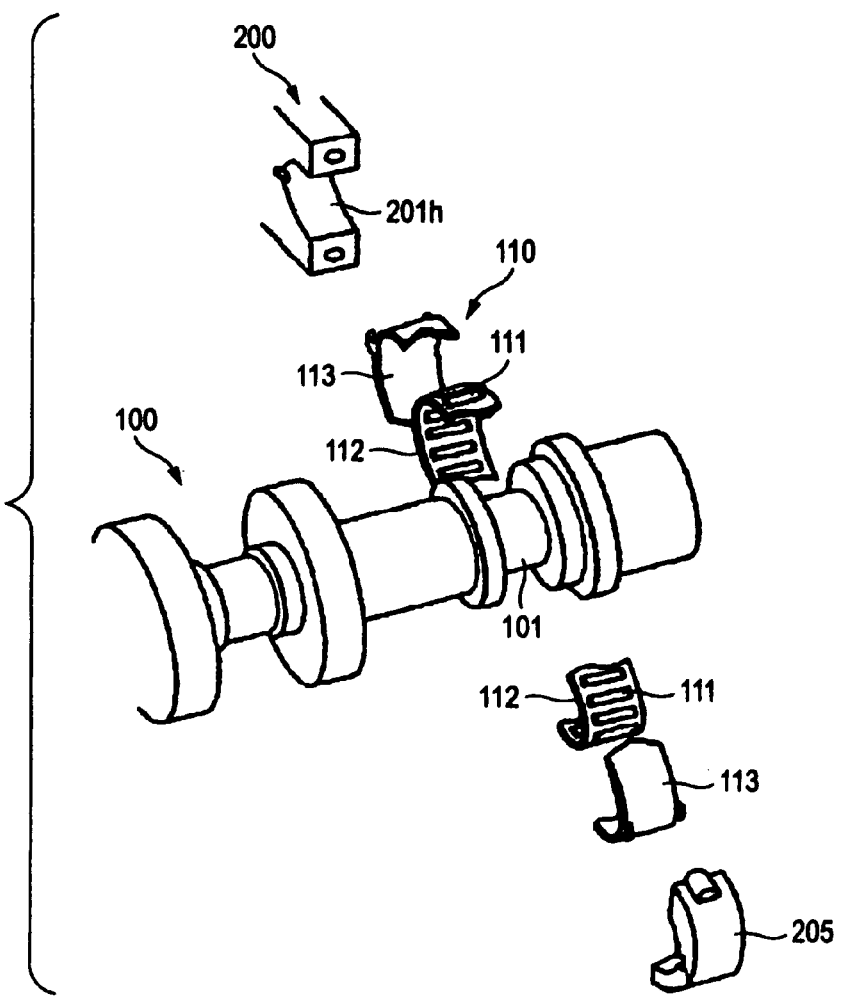
PRIOR ART
FIG. 20

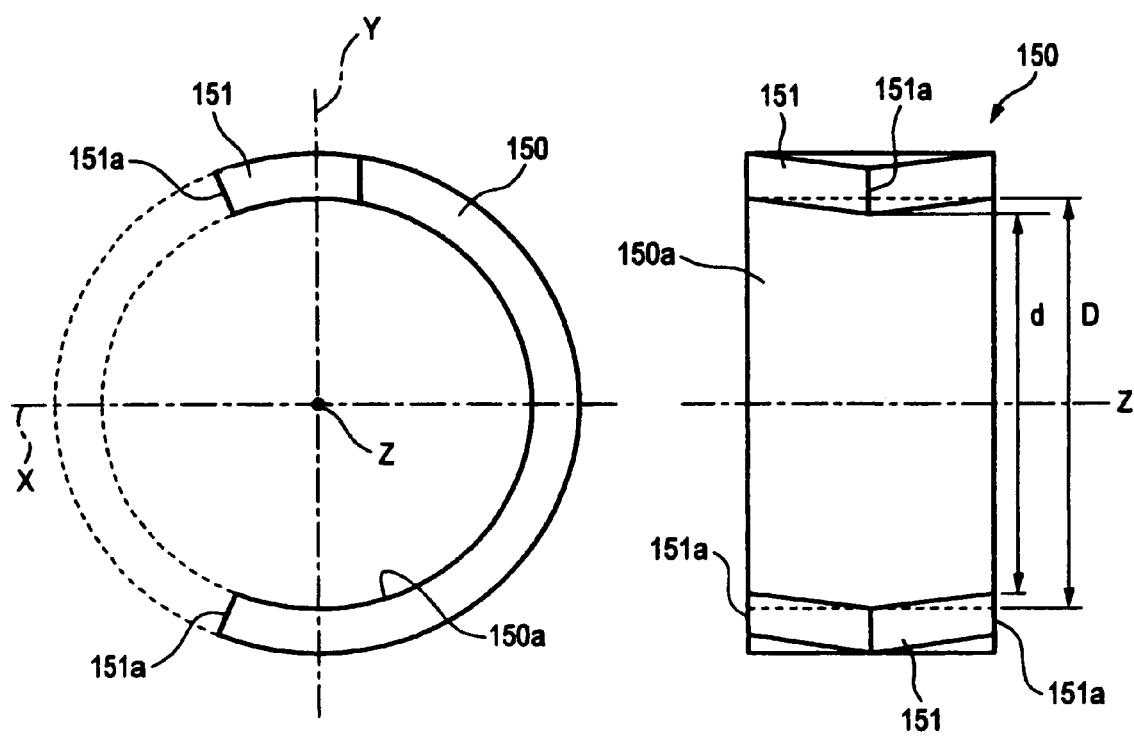
PRIOR ART
FIG. 21A
PRIOR ART
FIG. 21B

PRIOR ART    *FIG. 22*
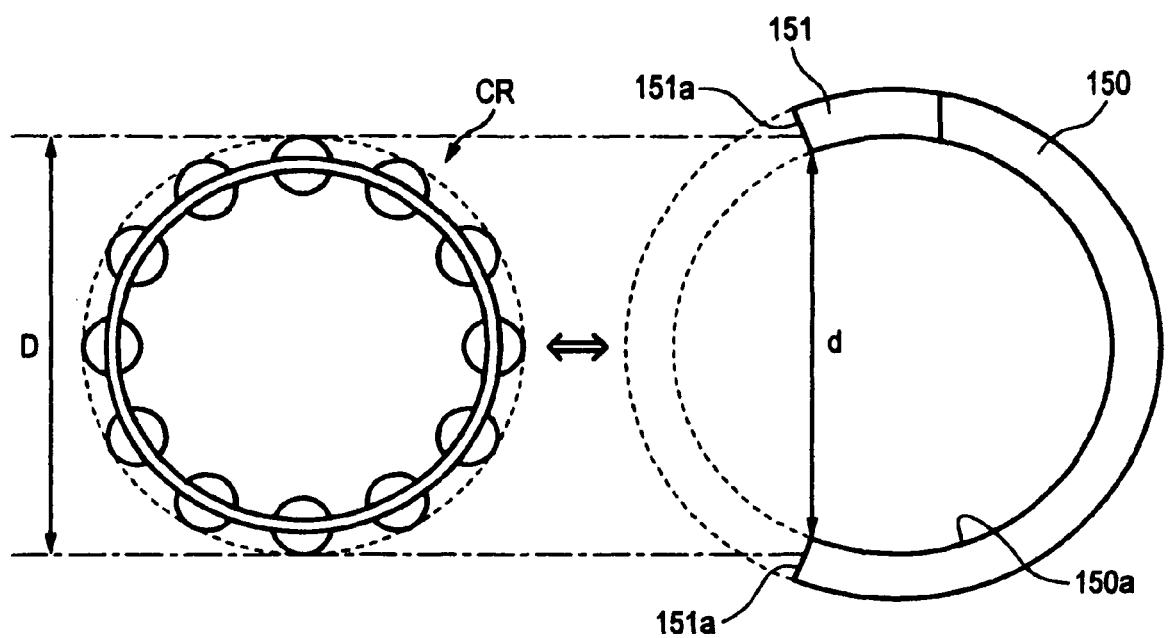

PRIOR ART
FIG. 23A
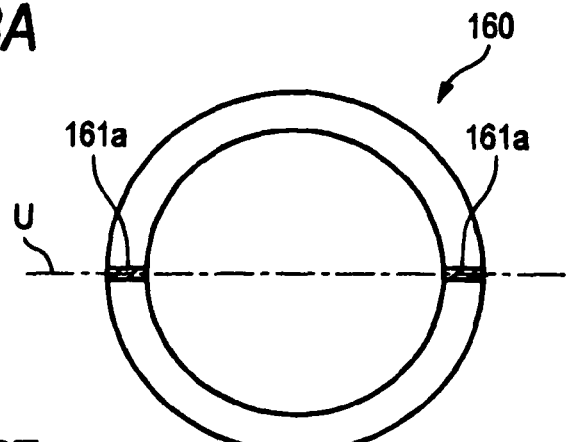
PRIOR ART
FIG. 23B
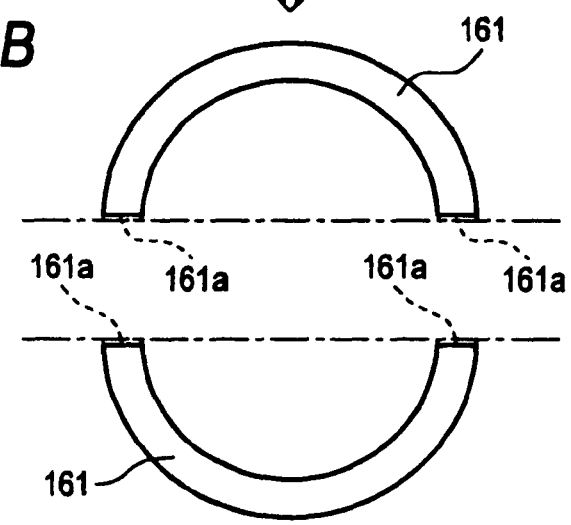
PRIOR ART
FIG. 23C
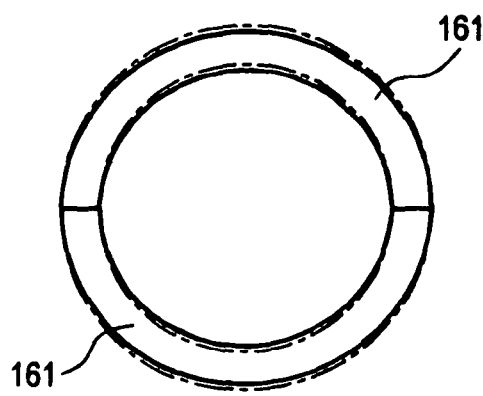

ROLLING BEARING APPARATUS

BACKGROUND OF THE INVENTION

1. Field of the Invention

The present invention relates to a rolling bearing or a rolling bearing apparatus suitably used to rotatably support a cam shaft in a cylinder head of an engine. More specifically, the present invention relates to a two-split outer ring that is split in two parts in the circumferential direction and to a rolling bearing having the same.

2. Related Art

A large end part of a connecting rod, which is a bar for connecting a piston and a crankshaft in an engine, is coupled to the crankshaft with a rolling bearing disposed therebetween. As the rolling bearing, a split bearing ring (outer ring) that is split in two parts, for example, is used because of the features of the crankshaft.

A technology related to the rolling bearing apparatus is described in JP-A-2005-180459, for example.

As shown in FIG. 20, a rolling bearing 110 of Patent Document 1 is a shell bearing that is configured to be attached to a journal portion 101 of a cam shaft 100 from outside in the radial direction.

The rolling bearing 110 includes a plurality of rolling elements 111, a two-split cage 112 that retains the rolling elements 111, and a two-split shell-type outer ring 113 having a raceway surface of the rolling elements 111. The two-split cage 112 is attached to the journal portion 101 of the cam shaft 100 from outside in the radial direction. The two-split shell-type outer ring 113 is attached to the outer side of the cage 112. The cam shaft 100 is attached to a cylinder head 200 of an engine. At this time, the rolling bearing 110 is fitted to a semicircular concave portion 201h of the cylinder head 200. In such a state, the rolling bearing 110 is pressed by a semi-ring shaped cap 205, and both ends of the cap 205 are fixed with bolts to both sides of the semicircular concave portion 201h of the cylinder head 200. With this, the shell-type outer ring 113 of the rolling bearing 110 is fastened by the cap 205 and the semicircular concave portion 201h of the cylinder head 200. Thus, the rolling bearing 110 can have a favorable degree of roundness.

However, in recent years, the cylinder head 200 is mostly formed of aluminum alloy and the shell-type outer ring 113 of the rolling bearing 110 is usually formed of steel sheet. For this reason, as the engine temperature rises by the differing thermal expansion coefficient between the aluminum alloy and the steel sheet, a gap is generated between the shell-type outer ring 113 and the semicircular concave portion 201h and cap 205 of the cylinder head 200. With this, the degree of roundness of the shell-type outer ring 113 of the rolling bearing 110 is lowered. Moreover, the gap in the radial direction within the rolling bearing 110 increases and thereby to generate noise.

On the other hand, when the split bearing ring is split such that the splitting surfaces are linear, the splitting surfaces are likely to be misaligned with each other at the time of attachment and thus the handling properties are poor. For this reason, it is desired to form the splitting surfaces in a curved or inflected shape such as an S character with respect to the axial direction. According to a technology regarding a splitting method disclosed in JP-A-S54-163247, notches for inducing the splitting are formed in the outer peripheral surface of the bearing ring, and the bearing ring is pressurized by a pressure jig with the pressure focusing on the notches, thereby splitting the bearing ring along the notches into two parts. According to a technology regarding a splitting method disclosed in JP-A-2005-337352, a strip-shaped metal plate of which the end portions have a concave-and-convex shape is bent to form semicircular split parts.

With the advance of the technology, it has become possible to form the splitting surfaces to be greatly bent or inflected with respect to the axial direction when splitting the bearing ring. Thus, misalignment in the axial direction is efficiently prevented. However, a new attachment problem attributable to such a splitting method is generated.

For example, since the splitting surfaces of the split parts are connected with each other in the circumferential direction, they form a circular arc of which the central angle is larger than 180 degrees as viewed in side view. Specifically, as shown in FIG. 21A, a split part 150 has a semicircular arc (central angle: 180 degrees) on the right side of a straight line Y perpendicular to an axial line Z. A splitting surface 151 portion extends to the left side of the straight line Y. At this time, as shown in FIG. 21B, an opening width d between front end portions 151a of the splitting surface 151 is smaller than the inner diameter D of the inner peripheral surface 150a of the split part 150. Therefore, as shown in FIG. 22, for example, when the split part 150 (outer ring) received in a connecting rod (not shown) is fitted to a roller-attached cage CR wound around a crankshaft, the front end portions 151a serve as an obstacle, thereby deteriorating the attachment properties. This is because the outer diameter of the roller-attached cage CR is the same as the inner diameter D of the inner peripheral surface 150a of the split part 150, in which the inner peripheral surface 150a is used as a raceway surface of the roller, and because the opening width d is smaller than the outer diameter D as viewed in the X direction (see FIG. 21A).

As described forgoing, the splitting process is not stable and it is difficult to form the same splitting surfaces in a controlled manner. For example, when only one of the splitting surfaces is defective, it cannot be substituted by another one, thereby increasing the cost. Meanwhile, by cutting an end portion into a strip-shaped metal plate, the splitting surface can be formed in a shape in which the misalignment in the axial direction is not likely to occur. However, curving the metal plate in a semicircular shape is troublesome.

In JP-A-2005-337352, an end portion is cut into a strip-shaped metal plate and the metal plate is bent into a semicircular shape. Straight portions are provided at both ends of the metal plate, and the metal plate is fitted to a housing by elastically deforming the straight portions toward an inner side. However, such process steps are troublesome.

A method can be conceived in which the split bearing ring is formed by a cutting process rather than the splitting process. However, as shown in FIG. 23A, for example, when a circular bearing ring 160 is cut along a straight line U by a wire-cut discharge process, the bearing ring 160 is split into two split parts 161 and 161 (see FIG. 23B). At that time, a cut portion 161a is also removed by a wire. Therefore, as shown in FIG. 23C, when the two split parts 161 and 161 are assembled with each other, the assembled bearing ring 160 cannot form a perfect circle but forming an elliptical shape deformed from the original shape before the splitting since the cut portion 161a is removed. Since the two split parts 161 and 161 cannot be maintained in the assembled state, it is difficult to polish the outer peripheral surface into a circular shape. Therefore, in such a state, it cannot be used as the outer ring of a rolling bearing.

SUMMARY OF THE INVENTION

The invention has been made in view of the above-described problems, and an object of the invention is to provide a rolling bearing apparatus capable of suppressing deterioration in the roundness of the rolling bearing apparatus and thereby to suppress the generation of noise in a bearing part.

Further, another object of the invention is to provide a two-split outer ring and a rolling bearing using the same, which can suppress the misalignment in the axial direction and can be attached to the place of use even when the splitting surfaces at both ends of a split part are greatly curved or inflected.

Furthermore, another object of the invention is to provide a rolling bearing having good assembling properties, in which the degree of freedom in the circular shape of an outer ring is high.

The above-described problems are solved by the following aspects of the invention.

According to a first aspect of the invention, there is provided a rolling bearing apparatus that rotatably supports a cam shaft in a cylinder head of an engine, the apparatus including: a plurality of rolling elements; a cage that positions the rolling elements so as to be spaced at regular intervals from each other in a circumferential direction and that retains the rolling elements in a freely rotatable manner; a shell-type outer ring configured to receive the rolling elements and the cage and having a raceway surface of the rolling elements at an inner side thereof; and an outer ring fastening member formed of a material having almost the same thermal expansion coefficient as the shell-type outer ring and having a press-fit portion press-fitted to the shell-type outer ring.

According to the above aspect of the invention, the shell-type outer ring is press-fitted to the press-fit portion of the outer ring fastening member. For this reason, the shell-type outer ring is applied with a uniform fastening force by the outer ring fastening member in the circumferential direction from the outside in the radial direction. Therefore, the shell-type outer ring can have a favorable degree of roundness.

Since the outer ring fastening member is formed of a material having almost the same thermal expansion coefficient as the shell-type outer ring, a gap is not generated between the outer ring fastening member and the shell-type outer ring even when the engine temperature changes. Therefore, the roundness of the shell-type outer ring is not deteriorated with a change in the engine temperature. Moreover, even when the cylinder head is more expanded by the temperature rise, the gap in the radial direction within the rolling bearing apparatus is not increased by the action of the outer ring fastening member. For this reason, the generation of noise in the bearing part is suppressed.

According to a second aspect of the invention, the outer ring fastening member has a cylindrical shape so that an inner side thereof serves as the press-fit portion, and the outer ring fastening member is configured to be fitted to a semicircular concave portion formed in a bearing supporting portion of the cylinder head from a radial direction.

Since the outer ring fastening member is formed in a cylindrical shape, it becomes easy to manufacture the outer ring manufacturing member.

According to a third aspect of the invention, the outer ring fastening member has a pair of ribs that are disposed on the same plane and protrude from an outer peripheral surface of the outer ring fastening member to the outside in the radial direction. Moreover, the paired ribs are fixed to upper flat surfaces of the bearing supporting portion, provided at both sides of the semicircular concave portion in a state that the outer ring fastening member is fitted to the semicircular concave portion of the bearing supporting portion of the cylinder head.

In this way, the outer ring fastening member can be directly fixed to the bearing supporting portion of the cylinder head, it is possible to obviate the necessity of a semi-ring shaped cap for pressing the rolling bearing apparatus. For this reason, it is possible to decrease the number of process steps required for attaching the cam shaft.

According to the invention, the roundness of the shell-type outer ring is not deteriorated with a change in an engine temperature, and the gap in the radial direction within the rolling bearing apparatus is not increased. Therefore, the generation of noise in the bearing part is suppressed.

According to an aspect of the invention, there is provided a two-split outer ring having a raceway surface for receiving rollers on an inner peripheral surface, the outer ring being split into two split parts in the circumferential direction and formed in a cylindrical shape by assembling the split parts with each other, wherein the split parts are formed by splitting a cylinder material, which constitutes the two-split outer ring, along a splitting line that is meandering or inflected with a predetermined vibration width with respect to the axial direction, and front end portions of splitting surfaces formed at both ends in the circumferential direction are formed such that the split parts form circular arcs having a central angle greater than 180 degrees as viewed from the axial direction, and wherein in the inner peripheral surfaces of the split parts, the minimum gap of the opposing inner peripheral surfaces extending from both ends of a certain circular arc portion having a central angle of 180 degrees as viewed from the axial direction to the respective front ends is equal to or greater than the inner diameter of the split parts.

According to the above aspect of the two-split outer ring, the two split parts that constitute the outer ring are split along a splitting line that is meandering or inflected with a predetermined vibration width. The split parts form a circular arc having a central angle greater than 180 degrees as viewed from the axial direction. The inner peripheral surfaces of the split parts are formed such that the minimum gap of the opposing inner peripheral surfaces extending from both ends of a certain circular arc portion having a central angle of 180 degrees (as viewed from the axial direction) to the respective front ends is equal to or greater than the inner diameter of the split parts (inner peripheral surfaces). That is, the inner peripheral surfaces of the split parts have semicircular bottom portions. Inner peripheral surface adjoining both ends of the bottom portions form guide surfaces. The bottom portions are open. Therefore, it is possible to place a roller-attached cage or the like that uses the inner peripheral surfaces as a raceway surface at the position corresponding to the bottom portions in a simple manner.

In addition, in order to improve the workability during attachment operations, the split parts can be rendered to have splitting surfaces that are curved or inflected with respect to the axial direction without increasing the number of splitting operations of the split parts. For example, by splitting a cylinder material at two positions in the circumferential direction in a meandering or inflected manner with respect to a splitting line that splits the cylinder material along a plane that includes an axial line, both of the two split parts can form a circular arc of which the central angle is greater than 180 degrees. In such a case, by forming the inner peripheral surfaces of the split parts so as to have the above described configuration, the same effect and advantages can be provided.

According to another aspect of the invention, there is provided a two-split outer ring having a raceway surface for receiving rollers on an inner peripheral surface, the outer ring being split into two split parts in the circumferential direction and formed in a cylindrical shape by assembling the split parts with each other, wherein the split parts are formed by splitting a cylinder material, which constitutes the two-split outer ring, along a splitting line that is meandering or inflected with a predetermined vibration width with respect to the axial direction, and front end portions of splitting surfaces formed at both ends in the circumferential direction are formed such that the split parts form circular arcs having a central angle greater than 180 degrees as viewed from the axial direction, and wherein in the inner peripheral surfaces of the split parts, the inner peripheral surfaces extending from both ends of a certain circular arc portion having a central angle of 180 degrees as viewed from the axial direction to the respective ends are formed such that the inner peripheral surfaces do not intrude to the inner side of tangential lines at both ends thereof.

According to the above aspect of the two-split outer ring, the two split parts that constitute the outer ring are split along a splitting line that is meandering or inflected with a predetermined vibration width. The split parts form a circular arc having a central angle greater than 180 degrees as viewed from the axial direction. The inner peripheral surfaces of the split parts are formed such that the inner peripheral surfaces extending from both ends of a certain circular arc portion having a central angle of 180 degrees (as viewed from the axial direction) to the respective ends are formed such that the inner peripheral surfaces do not intrude to the inner side of tangential lines at both ends thereof. The inner peripheral surfaces extending from both ends of the semicircular bottom portions to the front ends are formed in a straight line shape at least along the directions of the tangential lines thereof. With this, portions of which the gap is smaller than the inner diameter are not present between the opening portion formed by the front end portions and the bottom portions. Therefore, it is possible to place a roller-attached cage or the like that uses the inner peripheral surfaces as a raceway surface at the positions corresponding to the bottom portions in a simple manner.

The inner peripheral surfaces of the split parts the two-split outer ring may be formed such that, as viewed from the axial direction, the gap between the front end portions along the direction of a straight line connecting the front end portions increases toward the front end side. The split parts of the two-split outer ring may be formed such that as viewed from the axial direction, the split parts are perpendicular to a straight line connecting the respective front end portions thereof and symmetric to a straight line perpendicular to the axial line. With this, the inner diameters of the split parts are increased as the split parts extend close to the attachment start-point. At the time of placing a roller-attached cage or the like, the cage can be guided and the attachment properties are improved. In addition, since the respective front end portions of the split parts are formed symmetrically, they can be manufactured in a batch process, thereby decreasing the manufacturing cost. [0014]-(2)

Therefore, it is possible to form a rolling bearing including the two-split outer ring having the above described construction, a plurality of rollers that uses the inner peripheral surfaces as their raceway surface, and a cage for retaining the rollers, the rollers and the cage being provided in the inner side of the two-split outer ring. That is, it is possible to provide a rolling bearing equipped with a two-split outer ring having excellent attachment workability.

According to an aspect of the invention, there is provided a rolling bearing comprising an outer ring having a raceway surface for receiving rollers on an inner peripheral surface, the outer ring being split into two split parts in the circumferential direction and formed in a cylindrical shape by assembling the split parts with each other, wherein the split parts are formed by being split by cutting a cylinder material, which constitute the outer ring, in an axial direction, and wherein the outer ring has an elastic member filled between opposing splitting surfaces formed at both end in the circumferential direction of the split parts, the opposing splitting surfaces being offset in the circumferential direction by the elastic member and the outer ring being formed in a cylindrical shape.

According to the aspect of the invention, the elastic member is filled between the opposing splitting surfaces of the paired split parts. For example, even when the cutting allowance is removed by such a cutting process describe above so that the assembled split parts can no longer have the original cylindrical shape before the cutting, the elastic member can compensate the deformation of the assembled split parts. That is, since the opposing splitting surfaces are offset in the circumferential direction by the elastic member, the outer ring can have a cylindrical shape. Further, the cutting process can be performed as a splitting means with a simple structure that the elastic member is provide at the end portions of the split parts. Therefore, it is possible to provide a rolling bearing equipped with a two-split outer ring having splitting surfaces of which the degree of freedom in shape is high.

Since the elastic member is filled between the opposing splitting surfaces, for example, when the outer ring (rolling bearing) is attached to the inner side of a certain place of attachment (housing), a pre-compressing effect is obtained that the elastic member urges the splitting parts to be broadened, whereby the attachment can be efficiently with no clearance formed between the outer ring and the housing. With no clearance between the outer ring and the housing and by the vibration suppressing effect of the elastic member, it is possible to provide a rolling bearing that does not generate the vibrations and noises.

The outer ring may be formed by splitting the cylinder material into substantially the same semi-cylindrical shape. The elastic member may be filled between the opposing splitting surfaces disposed at two positions in the circumferential direction. The gaps between the opposing splitting surfaces disposed at two positions may be maintained by the elastic member so as to be equal to each other. With this, since the gaps between the respective opposing splitting surfaces is maintained so as to be equal to each other, the paired split parts are symmetric to a straight line that passes the elastic member. Accordingly, it is possible to suppress or prevent the concentration of the stress by the rollers.

The outer ring may be formed by splitting the cylinder material along a splitting line that is meandering or inflected with a predetermined vibration width with respect to the axial direction, and the elastic member may be filled along the splitting line. With this, since the assembled split parts have the splitting surfaces that are meandering or inflected with a predetermined vibration width with respect to the axial direction, the misalignment with respect to the axial direction is not likely to occur and thus it is easy to place the elastic member. Further, since the two split parts can be integrated with each other by the elastic member, the workability such as carrying or attachment is improved.

The elastic member may be disposed so as not to expand to the inner side in the radial direction than the raceway surface of the outer ring. With this, the elastic member does not interfere the rolling of the rollers and thus the rollers can roll smoothly even when the rollers pass the positions of the opposing splitting surfaces. Therefore, it is possible to suppress or prevent the generation of vibrations or noises, which may otherwise be caused by the rollers making frictional contact with or being caught in the elastic member.

BRIEF DESCRIPTION OF DRAWINGS

FIG. 1A is a longitudinal sectional view of a rolling bearing apparatus according to a first embodiment of the invention, and FIG. 1B is a front view of the rolling bearing apparatus, taken along the line B-B in FIG. 1A.

FIG. 2A is a perspective view of a cam shaft, and FIG. 2B is a perspective view of a cylinder head of an engine.

FIG. 3 is a front view showing the state in which the rolling bearing apparatus is attached to the cylinder head of the engine.

FIG. 4A is a front view of a rolling bearing apparatus according to a modification, and FIG. 4B is a top view of the rolling bearing apparatus.

FIGS. 5A and 5B are a side view and a partly omitted, exploded perspective view, respectively, showing an example of a rolling bearing according to a second embodiment of the invention.

FIG. 6 is an exploded perspective view showing the state in which the rolling bearing is attached between a crankshaft and a large end part of a connecting rod.

FIG. 7 is a sectional view showing the attachment state of FIG. 6.

FIGS. 8A and 8B are side and front views of a split part.

FIG. 9 is a side sectional view of a two-split outer ring.

FIG. 10 is a side view of a split part according to a modification of the second embodiment.

FIG. 11 is a side view of a split part according to another modification of the second embodiment.

FIGS. 12A and 12B are a side view and a partly omitted, exploded perspective view, respectively, showing an example of a rolling bearing according to a third embodiment of the invention.

FIG. 13 is an exploded perspective view showing the state in which the rolling bearing is attached between a crankshaft and a large end part of a connecting rod.

FIG. 14 is a sectional view showing the attachment state of FIG. 13.

FIGS. 15A, 15B, and 15C are a perspective view, a sectional view along the line X-X, and a sectional view along the line Y-Y of an outer ring, respectively.

FIG. 16 is an enlarged sectional view showing the Z portion in FIG. 15B.

FIGS. 17A and 17B are sectional views according to a modification of the third embodiment, corresponding to FIG. 15C.

FIG. 18 shows another example corresponding to FIG. 16.

FIGS. 19A and 19B show another example of the outer ring, corresponding to FIG. 12B.

FIG. 20 is a perspective view of a rolling bearing apparatus known in the art.

FIGS. 21A and 21B are side and front views of a split part according to a related art.

FIG. 22 is a diagram showing an attachment step for attaching the split part according to a related art.

FIGS. 23A to 23C are diagrams showing cutting steps of a bearing ring.

DETAILED DESCRIPTION OF THE PREFERRED EMBODIMENTS

Hereinafter, embodiments of the invention will be described.

First Embodiment

A rolling beating apparatus according to a first embodiment of the invention will be described with reference to FIGS. 1A to 4B.

The rolling bearing apparatus of the present embodiment is a bearing apparatus that rotatably supports a cam shaft attached to a cylinder head of an engine. FIGS. 1A and 1B are longitudinal sectional views of the rolling bearing apparatus. FIGS. 2A and 2B are perspective views of a cam shaft and a cylinder head of an engine, respectively. FIG. 3 is a front view showing the state in which the rolling bearing apparatus is attached to the cylinder head of the engine. FIGS. 4A and 4B are front and top views of a rolling bearing apparatus according to a modification.

In the drawings, the X direction is a width direction of the cylinder head, the Y direction is a height direction thereof, and the Z direction is a front-rear direction thereof (or the axial direction of the cam shaft).

<Cylinder Head 200 of Engine and Cam Shaft 100>

Before describing the rolling bearing apparatus 1, a cylinder head 200 of an engine and a cam shaft 100 will be briefly described with reference to FIGS. 2A and 2B.

The cylinder head 200 of an engine forms a ceiling part of a combustion chamber (not shown) of the engine. Inlet and outlet valves (not shown) for opening or closing the inlet and outlet ports of the combustion chamber and a cam shaft 100 (see FIG. 2A) for operating the valves are attached to the cylinder head 200. As shown in FIG. 2B, a plurality of bearing supporting portions 201 are arranged on an upper surface side of the cylinder head 200 opposite the combustion chamber in the front-rear direction (Z direction) of the cylinder head 200. The bearing supporting portion 201 supports the rolling bearing apparatus 1 of the cam shaft 100. The bearing supporting portion 201 forms a vertical wall that extends in the width direction (X direction). A semicircular concave portion 201h is formed on an upper portion of the bearing supporting portion 201 so as to be fitted to a lower half portion of the rolling bearing apparatus 1. As shown in FIG. 3, upper flat surfaces 201u are formed on both sides of the bearing supporting portions 201 in the width direction of the semicircular concave portion 210h. Female-screw holes 201w are formed in the left and right, top flat surfaces 201u. Fastening bolts 203 of a semi-ring shaped cap 205 that presses an upper half portion of the rolling bearing apparatus 1 are fastened to the female-screw holes 201w.

As shown in FIG. 2A, the cam shaft 100 includes a shaft body 101, a plurality of cam lobes 103 that presses the inlet and outlet valves in the axial direction, and the rolling bearing apparatus 1 that rotatably supports the shaft body 101. The shaft body 101 has a plurality of cam fixing portions 101c to which the cam lobes 103 are fixed at predetermined positions and a plurality of journal portions 101j to which the rolling bearing apparatuses 1 are attached.

The cam shaft 100 is an assembly obtained by sequentially attaching the cam lobes 103 and the rolling bearing apparatuses 1 to the shaft body 101 so that the cam lobes 103 and the rolling bearing apparatuses 1 do not interfere with each other.

<Rolling Bearing Apparatus 1>

As shown in FIGS. 1A and 1B, the rolling bearing apparatus 1 includes a shell-type bearing 10 and an outer ring fastening member 20 to which a shell-type outer ring 12 of the shell-type bearing 10 is press-fitted. FIG. 1A is a longitudinal sectional view of the rolling bearing apparatus, and FIG. 1B is a front view of the rolling bearing apparatus, taken along the line B-B in FIG. 1A.

The shell-type bearing 10 is a bearing having a thin, shell-type outer ring 12 formed by pressing. The shell-type bearing 10 has elongated needle rollers 14 serving as rolling elements and a cage 16 that rotatably retains the needle rollers 14 at regular intervals in the circumferential direction. The shell-type bearing 10 does not have an inner ring, and the outer periphery of the journal portion 101$j$ of the cam shaft 100 is used as a raceway surface.

The shell-type outer ring 12 is formed of thin steel sheet, and includes an outer ring body 12$m$ having a cylindrical shape and inner flange portions 12$f$ having a ring shape and formed on both sides of the outer ring body 12$m$ in the axial direction. The inner peripheral surface of the outer ring body 12$m$ is used as a raceway surface of the needle rollers 14.

The dimension of the inner flange portions 12$f$ protruded from the raceway surface of the outer ring body 12$m$ is set sufficiently smaller than the diameter of the needle rollers 14. For this reason, a predetermined gap is formed between the inner peripheral end (protruding end) of the inner flange portions 12$f$ and the journal portions 101$j$ in a state in which the outer peripheral surface of the needle rollers 14 is in contact with the outer peripheral surface of the journal portions 101$j$ of the cam shaft 100.

The cage 16 is formed of thin steel sheet to have a cylindrical shape and has a plurality of pockets 16$p$ arranged at regular intervals in the circumferential direction. The pockets 16$p$ are formed in a slit shape that extends in the axial direction. The needle rollers 14 are fitted to the pockets 16$p$ from the outer peripheral side in a freely rollable manner. In the cage 16, the central portions in the axial direction of the board portions 16$b$ disposed between the adjacent pockets 16$p$ protrude toward the inner side in the radial direction. The gaps between the protruding portions are configured relatively small. With this, it is possible to prevent the needle rollers 14 from dropping toward the inner side in the radial direction.

The cage 16 having the needle rollers 14 fitted thereto is received in the axial direction in the shell-type outer ring 12 having the inner flange portion 12$f$ formed at one end thereof. The inner flange portion 12$f$ at the other end of the shell-type outer ring 12 having the needle rollers 14 and the cage 16 received therein is bent, whereby the assembly of the shell-type bearing 10 is completed.

As shown in FIGS. 1A and 1B, the outer ring fastening member 20 is a steel-made cylinder and configured to have the same axial length as the shell-type outer ring 12. The inner diameter of the outer ring fastening member 20 is configured to such a dimension that can press-fit the shell-type bearing 10. The thickness of the outer ring fastening member 20 is configured to such a dimension that can provide a strength enough to prevent deformation even when the shell-type bearing 10 is press-fitted.

The rolling bearing apparatus 1 is completed in a state that the shell-type bearing 10 is press-fitted to the outer ring fastening member 20. That is, the inner side of the outer ring fastening member corresponds to the press-fit portion of the invention.

As shown in FIG. 3, the lower half portion of the rolling bearing apparatus 1 is fitted to the semicircular concave portion 201$h$ of the bearing supporting portion 201 of the cylinder head 200 in a state in which the rolling bearing apparatus 1 is attached to the journal portion 101$j$ of the cam shaft 100. In such a state, the upper half portion of the rolling bearing apparatus 1 is pressed by the semi-ring shaped cap 205, whereby both ends of the cap 205 are fixed with bolts to the upper flat surfaces 201$u$ of the bearing supporting portion 201. With this, the cam shaft 100 is rotatably attached to the cylinder head 200.

<Advantage of Rolling Bearing Apparatus 1 According to Present Embodiment>

According to the rolling bearing apparatus 1 of the present embodiment, the shell-type outer ring 12 is press-fitted to the circular, outer ring fastening member 20. For this reason, the shell-type outer ring 12 is applied with a uniform fastening force by the outer ring fastening member 20 in the circumferential direction from the outside in the radial direction. Therefore, the shell-type outer ring 12 can have a favorable degree of roundness.

Since the outer ring fastening member 20 is formed of a material (steel) having almost the same thermal expansion coefficient as the shell-type outer ring 12, a gap is not generated between the outer ring fastening member 20 and the shell-type outer ring 12 even when the engine temperature changes. Therefore, the roundness of the shell-type outer ring 12 is not deteriorated with a change in the engine temperature. Moreover, even when the cylinder head 200 is more expanded by the temperature rise, the gap in the radial direction within the rolling bearing apparatus 1 is not increased by the action of the outer ring fastening member 20. For this reason, the generation of noise in the bearing part is suppressed. Since the outer ring fastening member 20 is formed in a cylindrical shape, it becomes easy to manufacture the outer ring manufacturing member 20.

<Modification>

The invention is not limited to the embodiment described above and can be modified in various ways within a range without departing from the spirit of the invention. For example, in the embodiment described above, the outer ring fastening member 20 is formed in a cylindrical shape. However, the cylindrical, outer ring fastening member 20 may be modified as shown in FIGS. 4A and 4B. Specifically, a pair of ribs 25 may be provided at both side of the outer ring fastening member 20 in the radial direction so as to protrude toward the outside in the radial direction. Bolt holes 25$h$ may be formed in the ribs 25 so that the outer ring fastening member 20 is directly fixed with bolts to the bearing supporting portion 201 of the cylinder head 200. With this, it is possible to obviate the necessity of the semi-ring shaped cap 205, thereby decreasing the number of process steps required for attaching the cam shaft 100.

An uneven surface may be formed in the outer peripheral surface of the circular, outer ring fastening member 20 so that the rolling bearing apparatus 1 can be rotated and fixed with respect to the semi-ring shaped cap 205 and the semicircular concave portion 201$h$ of the bearing supporting portion 201.

In addition, in the embodiment described above, the rolling bearing apparatus 1 uses the needle rollers 14 as the rolling elements. However, the kind of the rolling elements can be appropriately selected.

Second Embodiment

Hereinafter, a rolling bearing according to a second embodiment of the invention will be described with reference to the drawings. FIGS. 5A and 5B are a side view and a partly omitted, exploded perspective view, respectively, showing an example of a rolling bearing according to the second embodiment of the invention. FIG. 6 is an exploded perspective view showing the state in which the rolling bearing is attached between a crankshaft and a large end part of a connecting rod. FIG. 7 is a sectional view showing the attachment state of the rolling bearing of FIG. 6. FIGS. 8A and 8B are side and front views of a split part constituting an outer ring. FIG. 9 is a side sectional view of an outer ring obtained by assembling the split parts.

As shown in FIGS. 5A and 5B, a rolling bearing 1 has a two-split outer ring 320 (hereinafter, simply referred to as an outer ring) constituted by a pair of split parts 302 and 303 having a substantially semi-cylindrical shape, a plurality of rollers 304 disposed in the inner side of the paired split parts 302 and 303 and using the inner peripheral surface of the paired split parts 302 and 303 as their raceway surface, and a pair of split cage 305 and 306 having a semi-cylindrical shape and retaining the roller 304. In the split cages 305 and 306, pocket portions P are arranged at regular intervals in the circumferential direction so as to pass through the split cages 305 and 306 in the radial direction. The rollers 304 are received in the pocket portions P.

As shown in FIG. 6, the rolling bearing 301 that is split into two parts is used when connecting a connecting rod 309 to a crankshaft 307 having a crank pin 372 or a counter weight 373 or to a crank journal 371 of an engine of a vehicle such as an automobile. That is, the rolling bearing 301 is used when it is impossible to use a solid bearing that is placed to the place of attachment by press-fitting it from the axial direction. Specifically, the rolling bearing 301 is interposed between a large end part 309B of a connecting rod 309 and a crank pin 372 (see FIG. 7). The connecting rod 309 is a connecting bar that connects the crankshaft 307 and a piston 308 with each other. The connecting rod 309 performs a function of transforming a reciprocating movement of the piston 308 to a rotating movement of the crankshaft 307.

The connecting rod 309 has, at both ends thereof, a large end part 309B connected to the crank pin 372 (the crankshaft 307) and a small end part (not shown) connected to the piston 309. The connecting rod 309 includes some portions of the small end part (not shown) and the large end part 309B, a body part 391 having a rod 309R that connects these parts to each other, a cap part 392 forming the remaining portion of the large end part 309B, and a nut 393 that fixes the cap part 392 to the body part 391. A bolt 391b corresponding to the nut 393 is formed in the body part 391, the bolt and the nut are fastened through a bolt insertion hole 392b formed in the cap part 392.

As shown in FIG. 7, the rolling bearing 301 is held in the large end part 309B in a state that a concave portion 391a having a substantially semicircular shape provided in the body part 391 is assembled with a concave portion 392a having a substantially semicircular shape provided in the cap part 392. That is, as the outer ring 320 constituted by the paired split parts 302 and 303 is rotated integrally with the connecting rod 309, the crank pin 372 serving as an inner ring is rotated in a relative manner.

The details of the outer ring 320 will be described by referring to FIGS. 5A and 5B. In FIGS. 5A and 5B, the upper split part will be referred to a first split part 302, and the lower split part will be referred to as a second split part 303. As described above, the outer ring 320 is constituted by the first and second split parts 302 and 303 both having substantially the same semi-cylindrical shape. The first and second split parts 302 and 303 are formed such that a bearing ring (a cylinder material) having a cylindrical shape to be formed as the outer ring 320 is split by a splitting or cutting process.

As shown in FIG. 5A, the outer ring 320 is formed into a cylindrical shape in a state in which both end surfaces in the circumferential direction of the first and second split parts 302 and 303, specifically, the splitting surfaces 302a and 302b of the first split part 302 and the splitting surfaces 303b and 303a of the second split part 303 abut each other (see FIG. 5B).

The first and second split parts 302 and 303 are preferably formed in a nonlinear shape that is curved (meandering) or bent (inflected) with respect to the direction of an axial line O1 (see FIGS. 8A and 8B). With this, it is possible to efficiently suppress or prevent the misalignment in the axial direction when attaching to the crankshaft 307 or the connecting rod 309. In this embodiment, as shown in FIG. 5B, one ends of the split parts 302 and 303 protrude in the circumferential direction and the other ends thereof are recessed in the circumferential direction so that the splitting lines formed when assembling the respective split parts 302 and 303 of the outer ring 320 form a V shape. Front end portions 302p and 303p that protrude toward the center in the width direction are formed in the splitting surfaces 302a and 303a, respectively. Front end portions 302q and 303q that protrude toward both edges in the width direction are formed in the splitting surfaces 302b and 303b, respectively.

Next, the details of the split parts of the outer ring 320 will be described with reference to FIGS. 8A and 8B. Since the first and second split parts 302 and 303 have substantially the same shape, only the first split part 302 will be described and the description on the second split part 303 will be omitted. As shown in FIG. 8A, the first split part 302 has the front end portions 302p and 302q of the splitting surfaces 302a and 302b formed at both ends in the circumferential direction so that the first split part 302 form a circular arc of which the central angle is greater than 180 degrees as viewed from the direction of the axial line O1. The inner peripheral surface 302c of the first split part 302 is formed such that the inner peripheral surfaces extending from both ends of a certain circular arc having a central angle of 180 degrees to the front end portions 302p and 302q do not intrude toward the inner side than a tangential line at both ends thereof.

Specifically, since the first split part 302 forms a circular arc having a central angle greater than 180 degrees, as shown in FIG. 8A, the first split part 302 is formed on both left and right sides of the straight line L1 perpendicular to the axial line O1. That is, the first split part 302 is formed to include a circular arc portion on the right side of the straight line L1 having a central angle of 180 degrees and a circular arc portion that protrudes toward the left side by a distance of w. In the inner peripheral surface 302c of the first split part 302, the inner peripheral surfaces that extend from both end portions A and B of the circular arc portion having a central angle of 180 degrees to the front end portions 302p and 302q are formed as guide surfaces 302s and 302s by a polishing process, for example.

The guide surfaces 302s and 302s are formed as smooth surfaces so as to extend in a linear shape along the tangential lines L2 and L3 at the end portions A and B (see FIG. 8B). The thickness of the first split part 302 corresponding to the guide surfaces 302s and 302s is smaller than the thickness corresponding to the raceway portion. The gap between the opposing guide surfaces 302s and 302s is the same as the inner diameter of the first split part 302. With this, the inner peripheral surface 302c of the first split part 302 has a U shape.

In the inner peripheral surface 302c of the first split part 302, as viewed from the direction of the axial line O1, the gap between the front end portions 302p and 302q along the direction (in this embodiment, the direction of the straight line L1) of a straight line connecting the front end portions increases toward the opening side (the front end side) increases toward the opening side (front end side). The first split part 302 is perpendicular to the straight line connecting the front end portions 302p and 302q and is symmetric to a straight line perpendicular to the axial line O1. With this, as shown in FIG. 9, when the outer ring 320 is formed by assembling the first and second split parts 302 and 303 with each other, it is possible to maintain a balance of weight as a whole, thereby contributing to stable rolling. Since the front end portions of the split parts 302 and 303 are connected with each other when the outer ring 320 is formed, it is possible to form the raceway surface without any gap in the circumferential direction. Thus, it is possible to suppress or prevent the generation of vibrations or noises due to the riding-on of the rollers.

That is, the first split part 302 is formed such that in the inner peripheral surface 302c of the first split part 302, the minimum distance between the opposing inner peripheral surfaces 302s and 302s extending from both ends of the circular arc portion having a central angle of 180 degrees to the respective front end portions 302p and 302q is greater than the inner diameter of the first split part 302.

When split cages 305 and 306 for retaining the rollers 304 using the inner peripheral surface 302c as their raceway surface are placed in the first split part 302 (see FIG. 22), the rollers 304 are guided by the guide surfaces 302s and 302s. Therefore, the rollers 304 can be relatively fitted straightly from the radial direction without contacting the guide surfaces 302s and 302s. That is, there are no obstacles in placing the split cage 305 and 306 and thus the attachment properties are improved, thereby increasing the workability. With this, it is possible to provide the rolling bearing 301 having excellent attachment properties (see FIGS. 5A and 5B).

Specifically, as shown in FIG. 6, when the outer ring 320 is interposed between the crankshaft 307 and the connecting rod 309, the split cages 305 and 306 can be fitted between the first and second split parts 302 and 303 in a state in which the split cages 305 and 306 having the rollers 304 retained therein are wound around the crankshaft 307. That is, as shown in FIG. 7, the rolling bearing 301 can be interposed between the crankshaft 307 and the connecting rod 309 in a simple manner. Accordingly, it is possible to provide the rolling bearing 301 having excellent attachment properties.

Next, a modification of the two-split outer ring of the second embodiment will be described with reference to FIGS. 10 and 11. In the following descriptions, those portions different from those of the embodiment described above will be mainly described. Those overlapping portions will be denoted by the same reference numerals and descriptions thereof will be omitted or simplified. First, as shown in FIG. 10, according to a split part 299 of this modification, guide surfaces 320s and 321s are formed to extend from intersections C and D along respective tangential lines L5 and L6, the intersections intersecting a straight line L4 perpendicular to the axial line O1 on an inner peripheral surface 302c. The split part 299 has a circular arc portion having a central angle of 180 degrees on the right side of the straight line L4 in the drawing. The lengths of the two guide surfaces 320s and 321s extending to the left side are different. In such a case, since the minimum distance between the two guide surfaces 320s and 321s is equal to or greater than the inner diameter, it is possible to fit a cage for retaining rollers that use the inner peripheral surface 302c as their raceway surface to the inner side of the split part 299.

As shown in FIG. 11, according to a split part 300 of another modification of the second embodiment, guide surfaces 322s and 323s start from the positions (points E and F) intruded to the right side of the straight line L1. With this, the inner gap of the split part 299 is larger than that of the cage for retaining the rollers that use the inner peripheral surface 302c as their raceway surface. Accordingly, it is possible to fit the cage to the split part 299 in a simple manner.

The invention is not limited to the embodiments described above but can be modified in various ways within the scope of the invention in accordance with the object and purpose of use. For example, in the second embodiment described above, the guide surfaces are formed to extend in a linear shape in the respective tangential directions as viewed in side view. However, the guide surfaces may be curved within a range that the surfaces do not intrude to the inner side than the tangential lines.

Third Embodiment

Hereinafter, a rolling bearing according to a third embodiment of the invention will be described with reference to the drawings. FIGS. 12A and 12B are a side view and a partly omitted, exploded perspective view, respectively, showing an example of a rolling bearing according to the third embodiment of the invention. FIG. 13 is an exploded perspective view showing the state in which the rolling bearing is attached between a crankshaft and a large end part of a connecting rod. FIG. 14 is a sectional view showing the attachment state of the rolling bearing of FIG. 13 FIGS. 15A to 15C are sectional views taken along the lines X-X and Y-Y, respectively. FIG. 16 is an enlarged view of the Z portion in FIGS. 15A to 15C.

As shown in FIGS. 12A and 12B, a rolling bearing 401 has a two-split outer ring 420 (hereinafter, simply referred to as an outer ring) constituted by a pair of split parts 402 and 403 having a substantially semi-cylindrical shape and elastic members 410 and 410 that are filled between the split parts 402 and 403, a plurality of rollers 404 disposed in the inner side of the paired split parts 402 and 403 and using the inner peripheral surface of the paired split parts 402 and 403 as their raceway surface, and a pair of split cage 405 and 406 having a semi-cylindrical shape and retaining the roller 404. In the split cages 405 and 406, pocket portions P are arranged at regular intervals in the circumferential direction so as to pass through the split cages 405 and 406 in the radial direction. The rollers 404 are received in the pocket portions P.

As shown in FIG. 13, the rolling bearing 401 that is split into two parts is used when connecting a connecting rod 409 to a crankshaft 407 having a crank pin 472 or a counterweight 473 or to a crank journal 471 of an engine of a vehicle such as an automobile. That is, the rolling bearing 401 is used when it is impossible to use a solid bearing that is placed to the place of attachment by press-fitting it from the axial direction. Specifically, the rolling bearing 401 is interposed between a large end part 409B of a connecting rod 409 and a crank pin 472 (see FIG. 14). The connecting rod 409 is a connecting bar that connects the crankshaft 407 and a piston 408 with each other. The connecting rod 409 performs a function of transforming a reciprocating movement of the piston 408 to a rotating movement of the crankshaft 407.

The connecting rod 409 has, at both ends thereof, a large end part 409B connected to the crank pin 472 (the crankshaft 407) and a small end part (not shown) connected to the piston 408. The connecting rod 409 includes some portions of the small end part (not shown) and the large end part 409B, a body part 491 having a rod 409R that connects these parts to each other, a cap part 492 forming the remaining portion of the large end part 409B, and a nut 493 that fixes the cap part 492 to the body part 491. A bolt 491b corresponding to the nut 493 is formed in the body part 491, the bolt and the nut are fastened through a bolt insertion hole 492*h* formed in, the cap part 492.

As shown in FIG. 14, the rolling bearing 401 is held in the large end part 409B in a state that a concave portion 491*a* having a substantially semicircular shape provided in the body part 491 is assembled with a concave portion 492*a* having a substantially semicircular shape provided in the cap part 492. That is, as the outer ring 420 constituted by the paired split parts 402 and 403 is rotated integrally with the connecting rod 409, the crank pin 472 serving as an inner ring is rotated in a relative manner.

The details of the outer ring 420 will be described by referring to FIGS. 15A to 15C. In FIGS. 15A to 15C, the upper split part will be referred to a first split part 402, and the lower split part will be referred to as a second split part 403. As shown in FIG. 15A, the outer ring 420 is constituted by the first and second split parts 402 and 403 both having substantially the same semi-cylindrical shape. The first and second split parts 402 and 403 are formed such that a bearing ring (a cylinder material), which constitutes the outer ring 420 is split by a splitting or cutting process (see FIGS. 23A to 23C).

As shown in FIG. 15B, the outer ring 420 includes elastic members 410 and 410 that are filled between the respective opposing splitting surfaces 402*a* and 402*b* and 403*b* and 403*a* formed at both ends of the split parts 402 and 403 in the circumferential direction. The outer ring 420 has a generally cylindrical shape in which the opposing splitting surfaces 402*a*, 402*b*, 403*a*, and 403*b* are offset in the circumferential direction by the elastic members 410 and 410. That is, the outer ring 420 is formed into a cylindrical shape in a state in which both end surfaces in the circumferential direction of the first and second split parts 402 and 403, specifically, the splitting surfaces 402*a* and 402*b* of the first split part 402 and the splitting surfaces 403*b* and 403*a* of the second split part 403 abut each other.

As shown in FIG. 15A, the first and second split parts 402 and 403 are split along nonlinear splitting lines (first and second splitting lines L1 and L2) that are meandering or inflected with a predetermined vibration width with respect to the axial direction (the axial line O1). With this, it is possible to efficiently suppress or prevent the misalignment in the axial direction at the time of attachment. In this embodiment, as shown in FIG. 15C, as viewed from the Y direction, the second splitting line L2 form an inverted-N shape (S shape) that includes vertex points P and Q above and below the axial line O1. Meanwhile, the first splitting line L1 and the second splitting line L2 are symmetrical with respect to the center of the outer ring 420. Therefore, the split parts can be replaced with each other. The splitting lines L1 and L2 are not limited to such a shape. For example, one of the splitting lines protrudes in the circumferential direction and the other splitting line is recessed in the circumferential direction so that the splitting lines form a V shape. The elastic members 410 and 410 are filled between the splitting surfaces along the splitting lines.

As shown in FIG. 15B, the diameter D of the outer ring 420 in a direction parallel to a straight line O2 is greater than the diameter d in a direction parallel to a straight line O3. For example, the thickness w of the elastic members 410 and 410 is greater than the cutting allowance that is removed by the cutting process. Therefore, the outer ring 420 is attached to the large end part 409B of the connecting rod in a pre-compressed state by the action of the elastic members 410 and 410. That is, when the outer ring 420 (the rolling bearing 401) is attached to the large end part 409B of the connecting rod (see FIG. 14), the opposing splitting surfaces press the elastic members 410 and 410 in the direction of the straight line O2 in a relative manner. Therefore, the outer ring 420 forms a cylindrical shape in which the diameters D and d are equal (i.e., the outer ring forms a perfect circle as viewed in side view). Accordingly, the outer peripheral surface of the outer ring 420 can be closely attached to the inner side of the large end part 409B of the connecting rod without any clearance.

The elastic members 410 and 410 are separately filled at two positions in the circumferential direction of the outer ring 420. The elastic members 410 and 410 are configured to have the same thickness w. Therefore, the gaps between the opposing splitting surfaces can be maintained so as to be equal to each other. With this, a uniform pre-compression force is applied to the outer ring 420 when the outer ring 420 is attached to the large end part 409B of the connecting rod, and thus the attachment is stable.

As shown in FIG. 16, the elastic members 410 and 410 are arranged so that they do not expand to the inner side in the radial direction than the inner peripheral surfaces 402*c* and 403*c* (raceway surfaces) of the first and second split parts 402 and 403 (the outer ring 420). That is, the inner peripheral surface 410*a* of the elastic member 410 is disposed at a position retreated toward the outer side in the radial direction than the raceway surface. In the compressed state, the elastic member 410 does not expand to the inner side in the radial direction than the raceway surface. With this, the rollers do not contact the elastic member 410 that is weak in strength, thereby preventing breakage of the elastic member 410. Since the inner peripheral surface 410*a* of the elastic member 410 is disposed at a position retreated inward from the raceway surface, a gap (step) is formed between the opposing splitting surfaces opposite the raceway surface. The joining portion of the inner peripheral surface and the splitting surfaces may be chamfered. With this, the rollers 404 can smoothly roll over the gap.

FIG. 18 is a diagram showing another example corresponding to FIG. 16. As shown in FIG. 18, the proximal portions 402*d* and 403*d* of the splitting surfaces of the first and second split parts 402 and 403 may be narrowed such that the proximal portions are recessed toward the outer side in the radial direction from the raceway surface (the inner peripheral surfaces 402*c* and 403*c*) of the rollers 404. In such a case, the rollers 404 can roll smoothly, thereby preventing the breakage of the elastic member 410.

The elastic member 410 is formed of an elastic body, such as rubber or an elastomer, which is shaped to extend along the splitting lines L1 and L2 that cut the bearing ring. In particular, an elastic body that is rich in elasticity in the circumferential direction of the outer ring 420 is suitable. In the present embodiment, the elastic member 410 is formed in an N shape (S shape) including two vertex points (see FIG. 12B).

FIGS. 19A and 19B are diagrams showing another example of the outer ring corresponding to FIG. 12B. As shown in FIG. 19A, the elastic member 410 may be simply placed between the opposing splitting surfaces 402*a* and 403*b*. Alternatively, the elastic member 410 may be integrated with one of the splitting surfaces 402*a* and 403*b* of the split parts 402 and 403 by a cure cohesion method. When the elastic member is integrated with the split parts of the outer ring, the handling properties during a bearing assembly process are improved. Alternatively, as shown in FIG. 19B, the elastic member 410 may be divided to have the same thickness and the divided elastic members are integrated with both of the splitting surfaces 402*a* and 403*b* of the split parts 402 and 403 by a cure cohesion method, whereby the divided elastic members are pressurized by each other. In this manner, by providing the elastic member to the end portions (the splitting surfaces) of the split part, the attachment workability is improved.

Although in the present embodiment, the housing of the rolling bearing is described as being the connecting rod, for example, when aluminum is used as a material of the housing and iron is used as a material of the outer ring (rolling bearing), of which the thermal expansion coefficients differ greatly, the differing thermal expansion or contraction can be effectively absorbed by filling (interposing) the elastic member between the opposing splitting surfaces. That is, since the thermal expansion coefficients of the aluminum and the iron differ greatly at the usage temperature in the range of −40° C. to 120° C., there is a fear that a radial clearance is generated between the rolling bearing and the housing resulting from the thermal expansion or contraction, thereby generating the vibrations or noises. The change (generation) of radial clearance can be suppressed by the elastic force of the elastic member.

Next, a modification of the rolling bearing of the third embodiment described above will be described with reference to FIGS. 17A and 17B. FIGS. 17A and 17B correspond to FIG. 15C. In the following descriptions, those portions different from those of the embodiment described above will be mainly described. Those overlapping portions will be denoted by the same reference numerals and descriptions thereof will be omitted or simplified. According an outer ring 500 shown in FIG. 17A, splitting surfaces 420b and 430a are opposed to each other with a large gap and are displaced from a splitting line L2 that is meandering or inflected with a predetermined vibration width with respect to the axial direction (the axial line O1). In such a case, since an elastic member 411 is filled between the opposing splitting surfaces 420b and 430a, the outer ring 500 can have a cylindrical shape as a whole.

According to an outer ring 600 shown in FIG. 17B, the outer ring 600 is cut along a splitting line L2 that is meandering or inflected with a predetermined vibration width with respect to the axial direction (the axial line O1), and a portion of the splitting surface 421b is notched in the circumferential direction. Moreover, elastic members 412 and 412 are filled between the splitting surface 421b and the splitting surface 431a opposite the splitting surface 421b except the notched portion. In such a case, the outer ring 600 can have a cylindrical shape as a whole. That is, the elastic member can be freely used without depending on the shape of the splitting surface.

The invention is not limited to the embodiments described above but can be modified in various ways within the scope of the invention in accordance with the object and purpose of use.

What is claimed is:

1. A two-split outer ring having a raceway surface for receiving rollers on an inner peripheral surface, the outer ring being split into two split parts in a circumferential direction and formed in a cylindrical shape by assembling the split parts with each other, wherein the split parts are formed by splitting a cylinder material, which constitutes the two-split outer ring, along a splitting line that is meandering or inflected with a predetermined vibration width with respect to an axial direction, and front end portions of splitting surfaces formed at both ends in the circumferential direction are formed such that the split parts form circular arcs having a central angle greater than 180 degrees as viewed from an axial direction, and wherein in the inner peripheral surfaces of the split parts, a minimum gap of the opposing inner peripheral surfaces extending from both ends of a certain circular arc portion having a central angle of 180 degrees as viewed from the axial direction to the respective front ends is equal to or greater than the inner diameter of the split parts.

2. The two-split outer ring according to claim 1, wherein in the inner peripheral surfaces of the split parts, as viewed from the axial direction, the gap between the front end portions along the direction of a straight line connecting the front end portions increases toward the front end side.

3. A rolling bearing comprising the two-split outer ring according to claim 1, a plurality of rollers that uses the inner peripheral surfaces as their raceway surface, and a cage for retaining the rollers, the rollers and the cage being provided in the inner side of the two-split outer ring.

4. A two-split outer ring having a raceway surface for receiving rollers on an inner peripheral surface, the outer ring being split into two split parts in the circumferential direction and formed in a cylindrical shape by assembling the split parts with each other, wherein the split parts are formed by splitting a cylinder material, which constitutes the two-split outer ring, along a splitting line that is meandering or inflected with a predetermined vibration width with respect to the axial direction, and front end portions of splitting surfaces formed at both ends in the circumferential direction are formed such that the split parts form circular arcs having a central angle greater than 180 degrees as viewed from the axial direction, and wherein in the inner peripheral surfaces of the split parts, the inner peripheral surfaces extending from both ends of a certain circular arc portion having a central angle of 180 degrees as viewed from the axial direction to the respective ends are formed such that the inner peripheral surfaces do not intrude to the inner side of tangential lines at both ends thereof.

5. The two-split outer ring according to claim 4, wherein in the inner peripheral surfaces of the split parts, as viewed from the axial direction, the gap between the front end portions along the direction of a straight line connecting the front end portions increases toward the front end side.

6. A rolling bearing comprising the two-split outer ring according to claim 4, a plurality of rollers that uses the inner peripheral surfaces as their raceway surface, and a cage for retaining the rollers, the rollers and the cage being provided in the inner side of the two-split outer ring.

* * * * *